United States Patent
Nangia et al.

(10) Patent No.: US 9,252,933 B2
(45) Date of Patent: Feb. 2, 2016

(54) RESOURCE ALLOCATION INCLUDING A DC SUB-CARRIER IN A WIRELESS COMMUNICATION SYSTEM

(71) Applicant: Google Technology Holdings LLC, Mountain View, CA (US)

(72) Inventors: Vijay Nangia, Algonquin, IL (US); Kevin L. Baum, Rolling Meadows, IL (US); Brian K. Classon, Palatine, IL (US); Hyejung Jung, Schaumburg, IL (US); Robert T. Love, Barrington, IL (US); Kenneth A. Stewart, Grayslake, IL (US)

(73) Assignee: Google Technology Holdings LLC, Mountain View, CA (US)

(*) Notice: Subject to any disclaimer, the term of this patent is extended or adjusted under 35 U.S.C. 154(b) by 0 days.

(21) Appl. No.: 13/960,922

(22) Filed: Aug. 7, 2013

(65) Prior Publication Data

US 2014/0044064 A1 Feb. 13, 2014

Related U.S. Application Data

(63) Continuation of application No. 11/466,345, filed on Aug. 22, 2006, now Pat. No. 8,509,323.

(51) Int. Cl.
*H04L 5/00* (2006.01)
*H04L 27/26* (2006.01)
(Continued)

(52) U.S. Cl.
CPC ............ *H04L 5/0042* (2013.01); *H04B 1/7103* (2013.01); *H04L 5/0058* (2013.01);
(Continued)

(58) Field of Classification Search
CPC ............ H04L 27/2608; H04L 27/2618; H04L 5/0058; H04L 5/0094; H04L 5/0042; H04B 1/7103

USPC ............. 375/260, 259; 455/59; 370/208, 329, 370/69.1
See application file for complete search history.

(56) References Cited

U.S. PATENT DOCUMENTS 6,545,997 B1 4/2003 Bohnke et al.
7,106,689 B1 * 9/2006 Sudo ............................. 370/208
(Continued)

FOREIGN PATENT DOCUMENTS

EP 1422897 A2 5/2004
EP 1033853 B1 7/2008

OTHER PUBLICATIONS

3GPP TR 25.814 V2.0.0 (Jun. 2006); 3rd Generation Partnership Project; Technical Specification Group Radio Access Network; Physical Layer Aspects for Evolved UTRA (Release 7).
(Continued)

*Primary Examiner* — Shuwang Liu
*Assistant Examiner* — Helene Tayong
(74) *Attorney, Agent, or Firm* — Faegre Baker Daniels LLP

(57) ABSTRACT

A method in a wireless communication terminal (103), including receiving a radio resource allocation comprising a plurality of sub-carriers that is a subset of available sub-carriers, wherein the available sub-carriers include a DC sub-carrier, wherein the DC sub-carrier and all but one edge-most sub-carrier of the plurality of sub-carriers are designated for transmission if the DC sub-carrier is between any two sub-carriers of the allocation, and all of the sub-carriers except the DC sub-carrier from the plurality of sub-carriers are designated for transmission if the DC sub-carrier is not between any two sub-carriers of the allocation.

11 Claims, 26 Drawing Sheets

(51) Int. Cl.
*H04B 1/7103* (2011.01)
*H04W 72/00* (2009.01)
*H04W 72/04* (2009.01)
*H04W 72/12* (2009.01)

(52) U.S. Cl.
CPC .......... *H04L5/0094* (2013.01); *H04L 27/2608* (2013.01); *H04L 27/2618* (2013.01); *H04W 72/00* (2013.01); *H04W 72/042* (2013.01); *H04W 72/0453* (2013.01); *H04W 72/12* (2013.01)

(56) References Cited

U.S. PATENT DOCUMENTS

| | | | |
|---|---|---|---|
| 7,146,172 | B2 | 12/2006 | Li et al. |
| 7,173,958 | B2 | 2/2007 | Ho et al. |
| 7,272,109 | B2 | 9/2007 | Webster et al. |
| 7,289,765 | B2 | 10/2007 | Okada et al. |
| 7,471,730 | B2 | 12/2008 | Adachi |
| 7,489,934 | B2 | 2/2009 | Li et al. |
| 7,596,080 | B2 | 9/2009 | Gerlach |
| 8,559,295 | B2 * | 10/2013 | Thomas et al. ............... 370/208 |
| 8,621,539 | B1 * | 12/2013 | Monk et al. ................... 725/111 |
| 2003/0174643 | A1 | 9/2003 | Ro et al. |
| 2003/0193922 | A1 | 10/2003 | Ho et al. |
| 2003/0215021 | A1 * | 11/2003 | Simmonds .................... 375/260 |
| 2003/0224731 | A1 * | 12/2003 | Yamaura et al. ............. 455/63.3 |
| 2004/0071078 | A1 * | 4/2004 | Sudo ............................ 370/208 |
| 2005/0111525 | A1 | 5/2005 | Driesen et al. |
| 2005/0117670 | A1 | 6/2005 | Webster et al. |
| 2005/0286408 | A1 | 12/2005 | Jin et al. |
| 2006/0135075 | A1 | 6/2006 | Tee et al. |
| 2006/0160498 | A1 * | 7/2006 | Sudo ............................ 455/103 |
| 2006/0198295 | A1 | 9/2006 | Gerlach |
| 2007/0010226 | A1 | 1/2007 | Laroia et al. |
| 2007/0036066 | A1 * | 2/2007 | Thomas et al. ............... 370/208 |
| 2007/0060178 | A1 | 3/2007 | Gorokhov et al. |
| 2007/0082692 | A1 | 4/2007 | Tirkkonen et al. |
| 2007/0217362 | A1 * | 9/2007 | Kashima et al. .............. 370/330 |
| 2007/0218915 | A1 | 9/2007 | Yang et al. |
| 2007/0242599 | A1 | 10/2007 | Gorday et al. |
| 2008/0025254 | A1 | 1/2008 | Love et al. |
| 2009/0129334 | A1 | 5/2009 | Ma et al. |
| 2009/0303918 | A1 | 12/2009 | Ma et al. |

OTHER PUBLICATIONS

Intel Technology Journal; vol. 08, Issue 03; Published Aug. 20, 2004; ISSN1535-864X; Scalable ORDMA Physical Layer in IEEE 802.16 WirelessMAN.
State Intellectual Property Office of the People's Republic of China, Notification of the Fourth Office Action for Chinese Patent Application No. 200780031169.1, mailed Aug. 27, 2013.
European Patent Office, International Search Report and Written Opinion for PCT Application No. PCT/US2007/074061, mailed Jan. 11, 2008.
European Patent Office, Office Action for European Patent Application No. 07813192.7, mailed Jun. 24, 2009.
European Patent Office, Extended European Search Report for European Patent Application No. 10186453.6, mailed Jun. 20, 2013.
Korean Intellectual Property Office, Notice of Preliminary Rejection for Korean Patent Application No. 10-2009-7003594, mailed Sep. 23, 2013.
State Intellectual Property Office of the People's Republic of China, Notification of the First Office Action for Chinese Patent Application No. 200780031169.1, mailed Jul. 26, 2011.
State Intellectual Property Office of the People's Republic of China, Notification of the Second Office Action for Chinese Patent Application No. 200780031169.1, mailed Jun. 5, 2012.

* cited by examiner

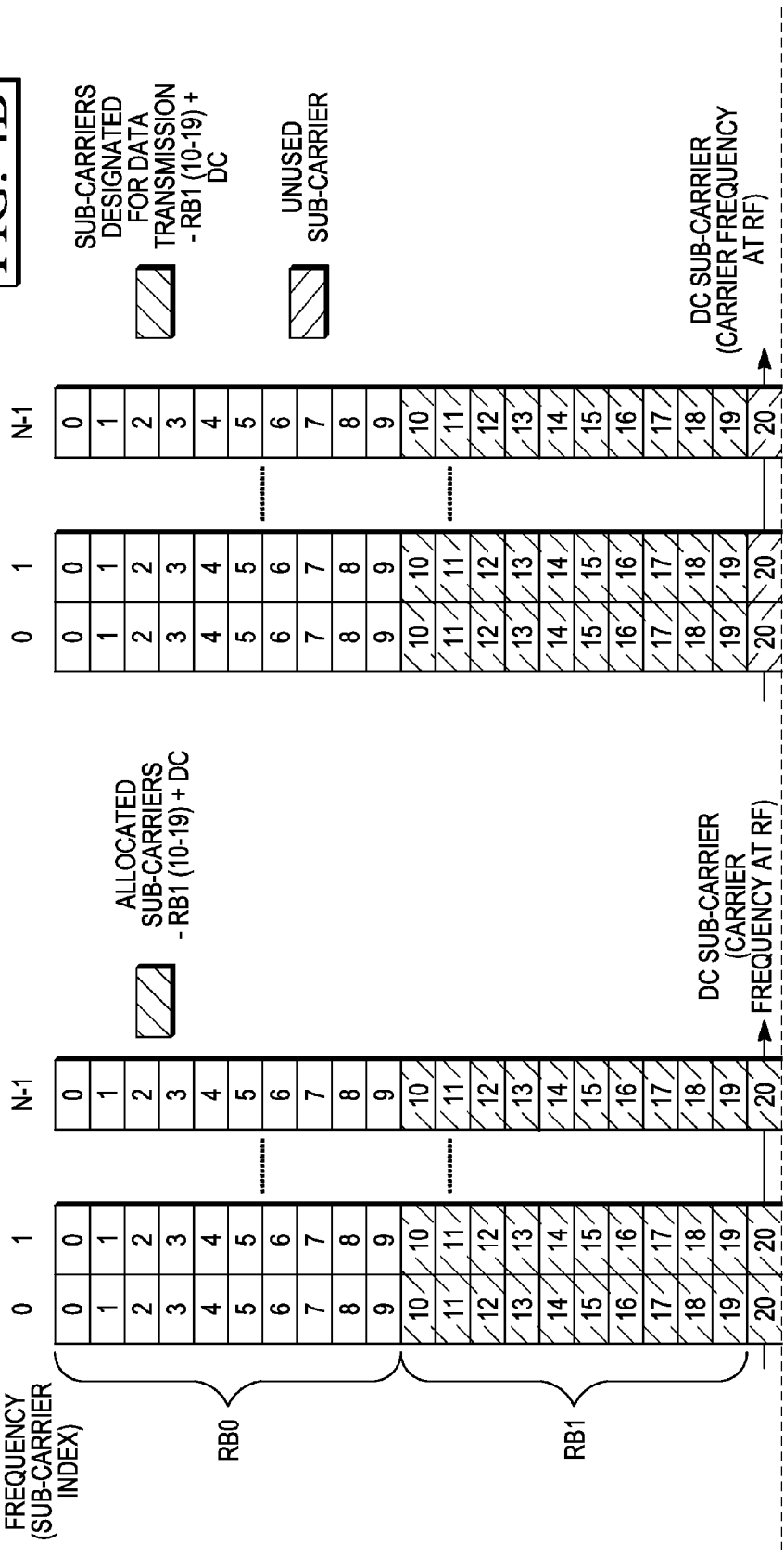

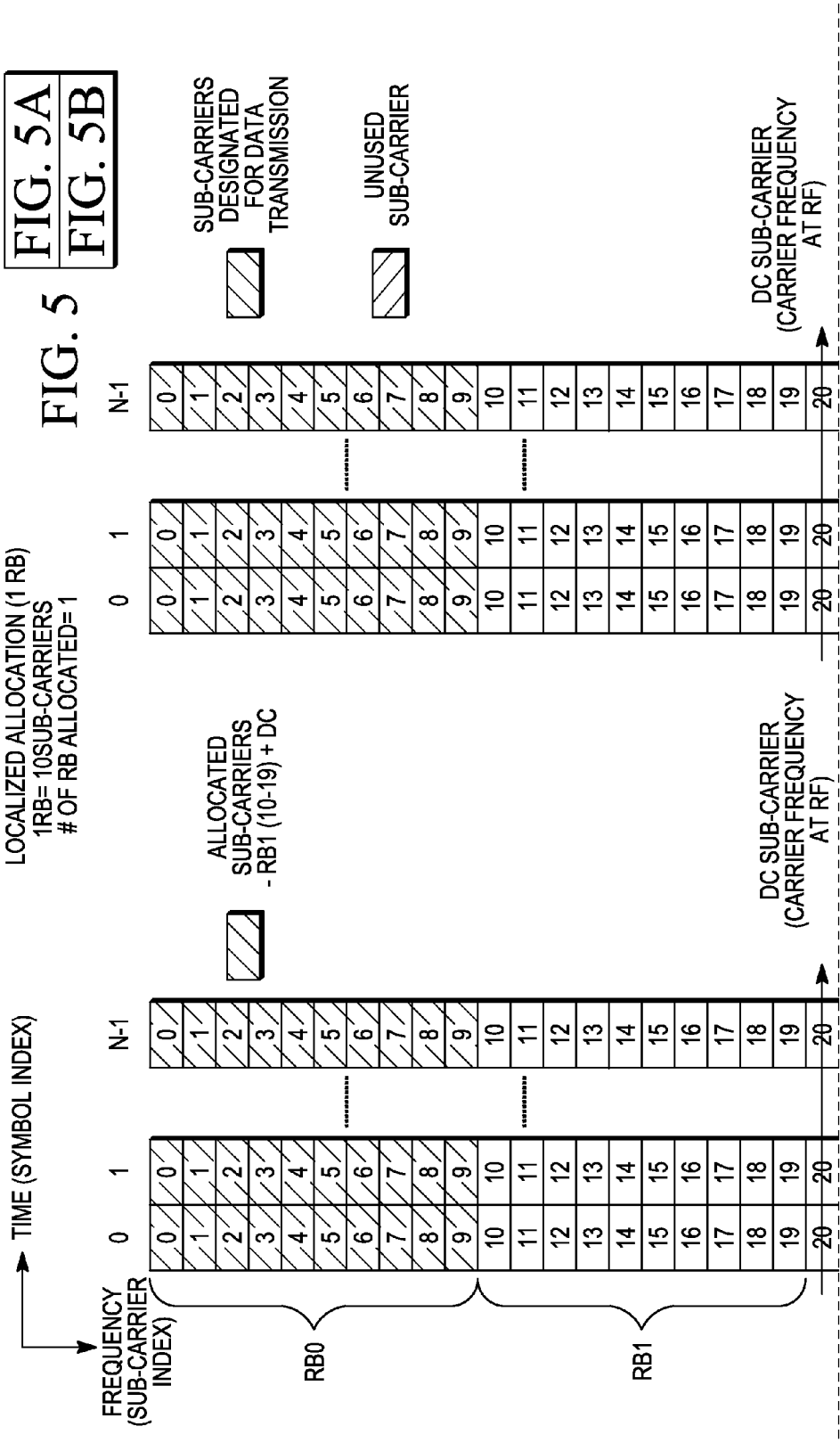

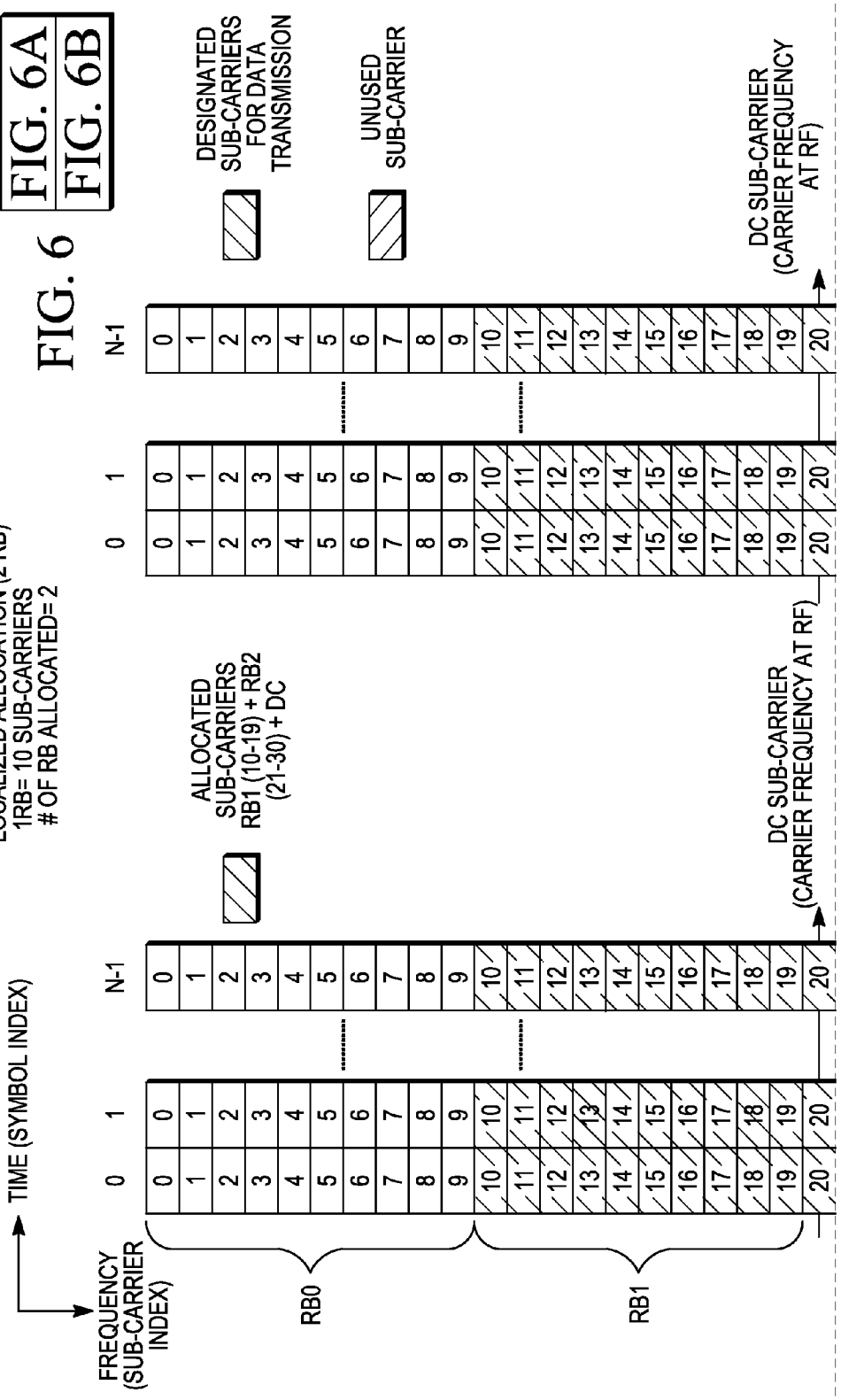

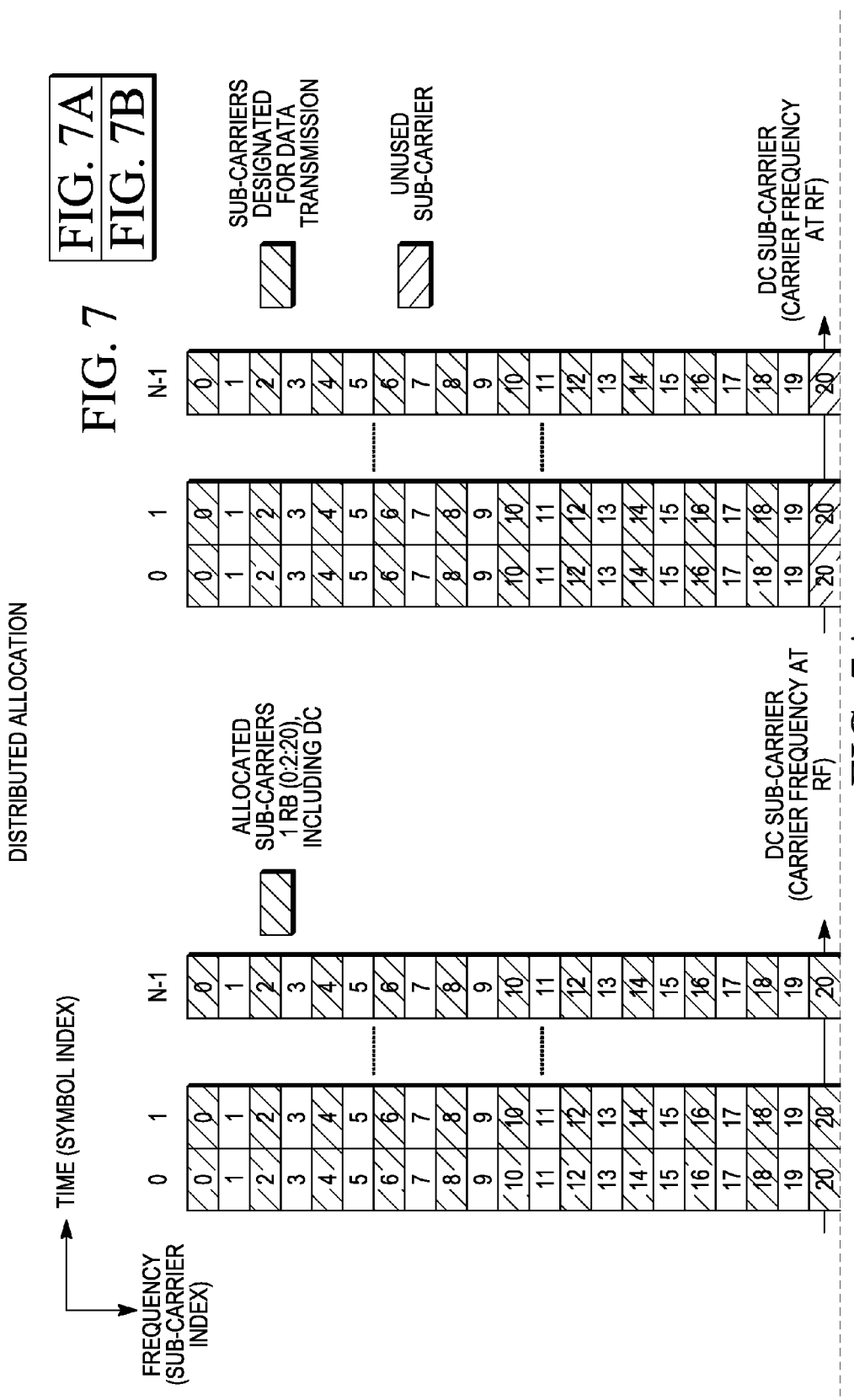

FIG.7B

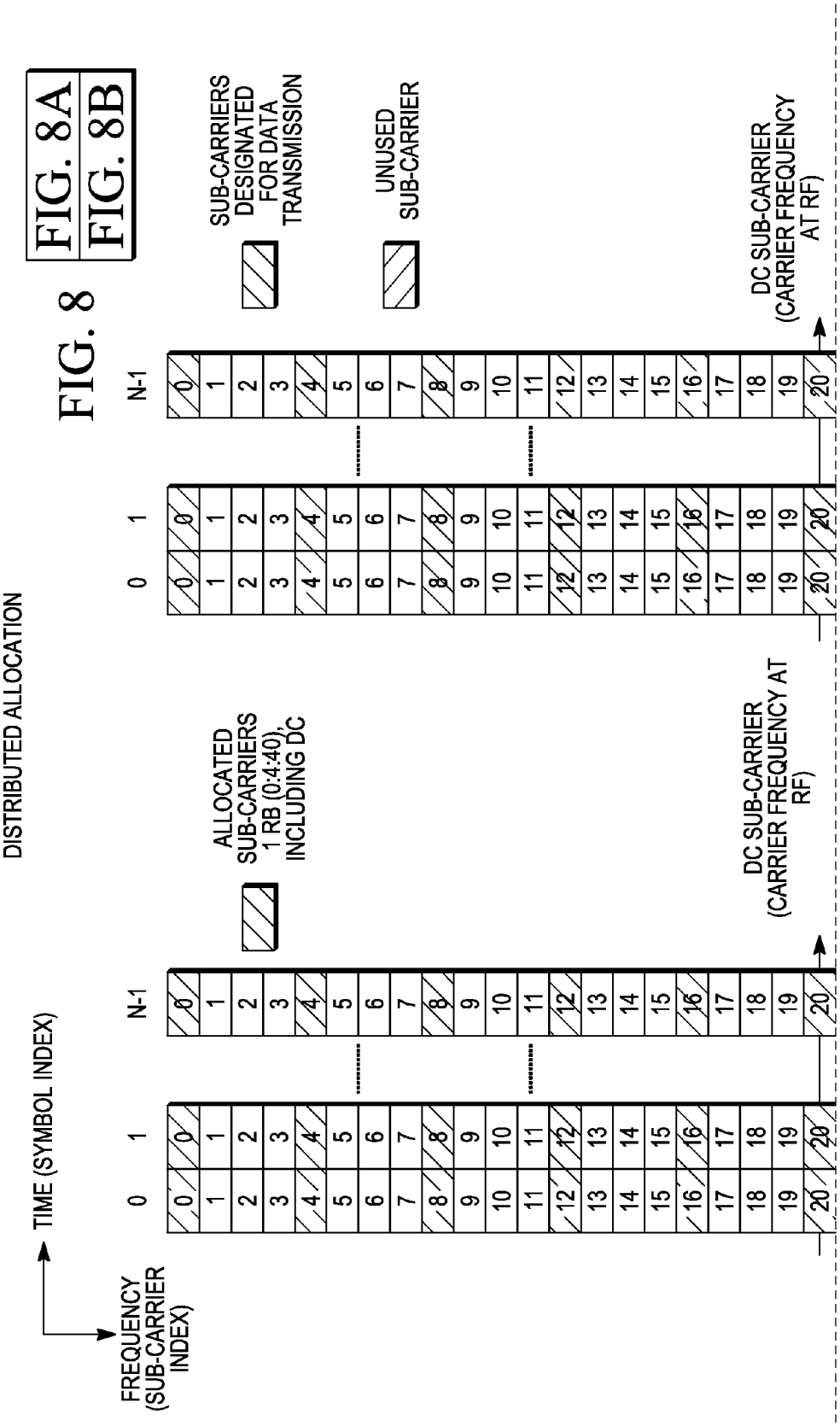

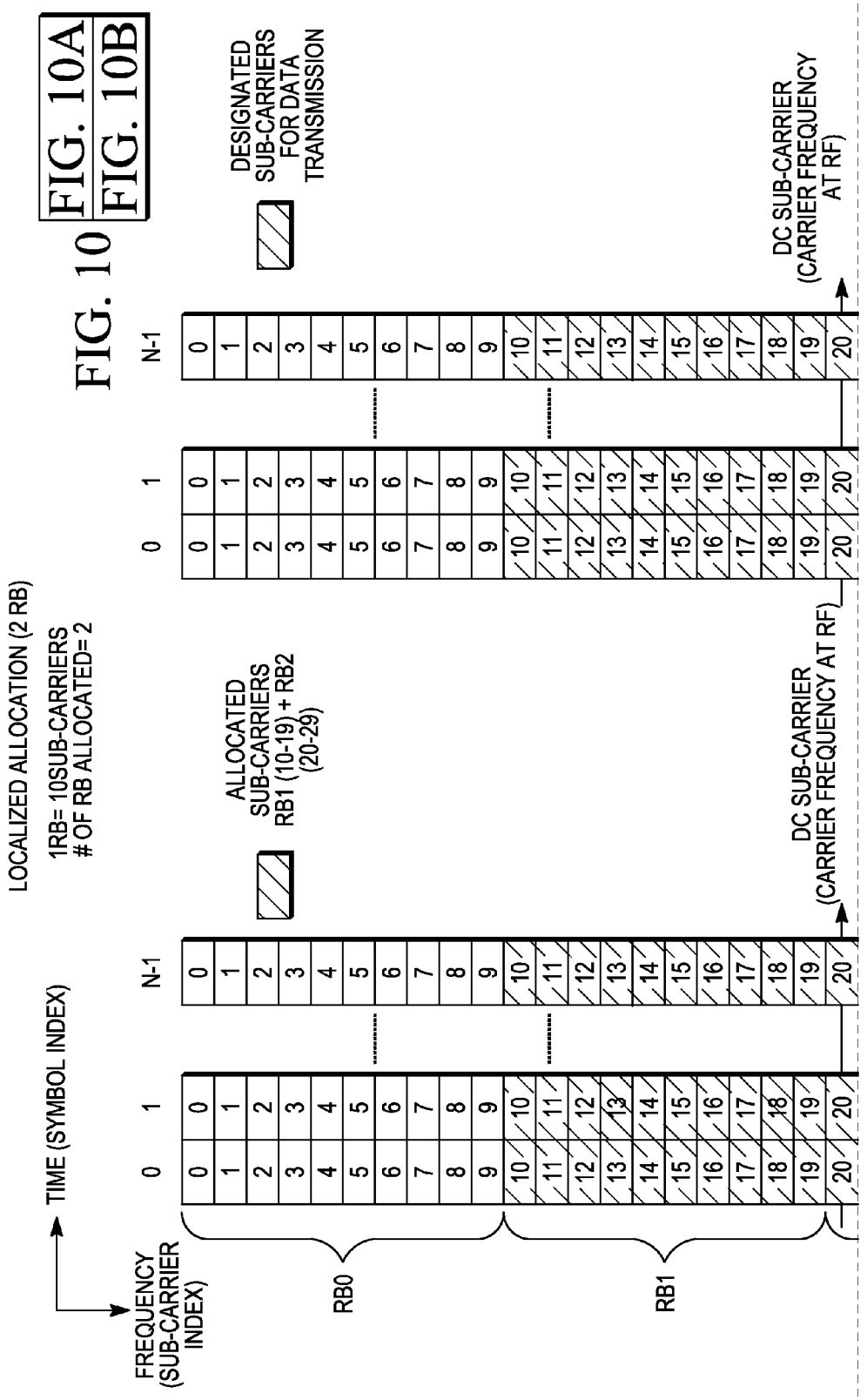

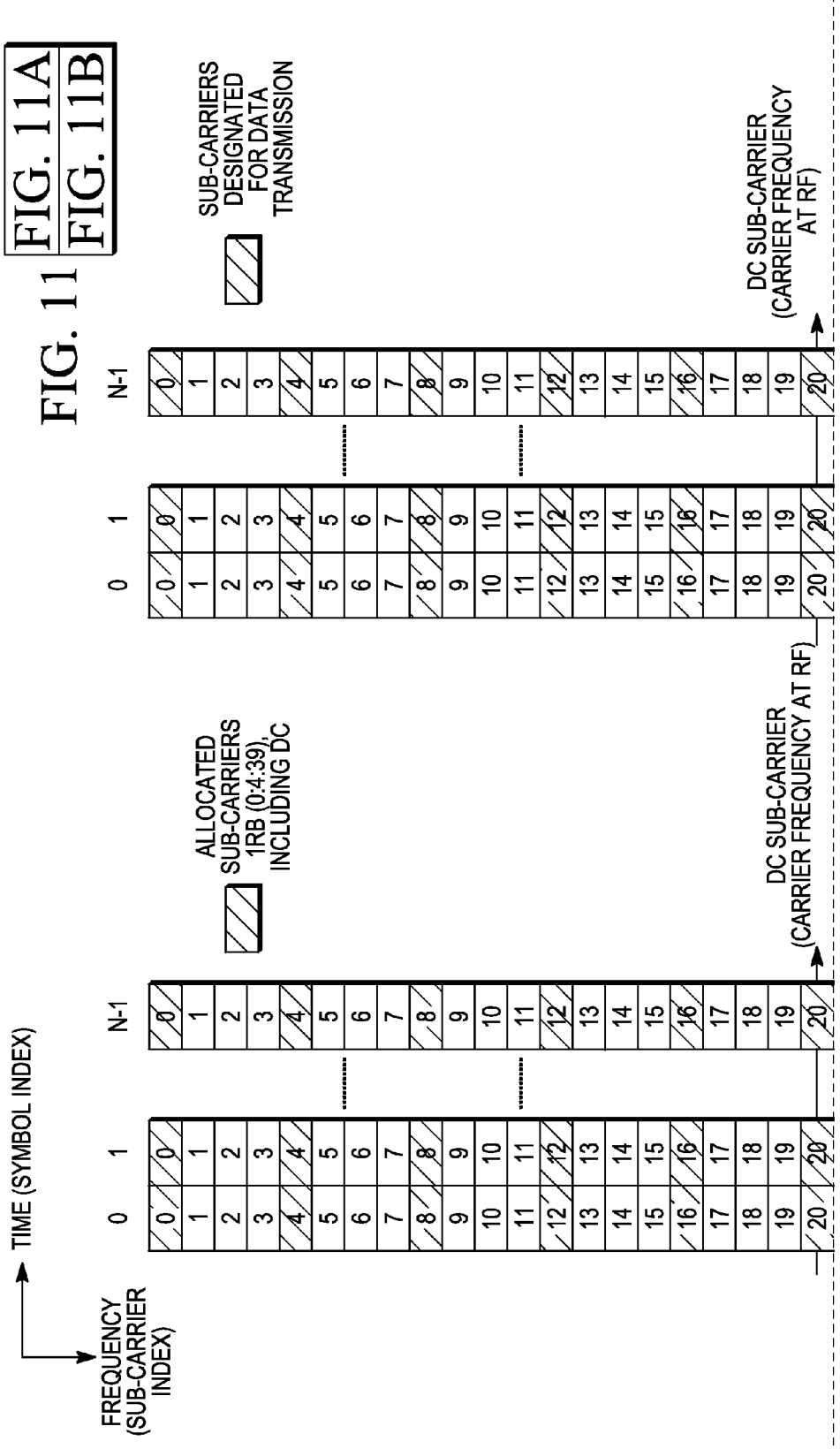

FIG.11B

DESIGNATED SUB-CARRIERS FOR TRANSMISSION WITH FREQUENCY SHIFT BY ½ SUB-CARRIER SPACING

ALLOCATED SUB-CARRIERS

FIG. 12

| FIG. 12A |
|----------|
| FIG. 12B |

LOCALIZED ALLOCATION (2 RB)

1RB= 10 SUB-CARRIERS
OF RB ALLOCATED=2

▨ ALLOCATED AND DESIGNATED SUB-CARRIERS FOR DATA TRANSMISSION RB1 (10-19)+ RB2 (20-29)

← DC SUB-CARRIER (CARRIER FREQUENCY AT RF)

FIG. 12A

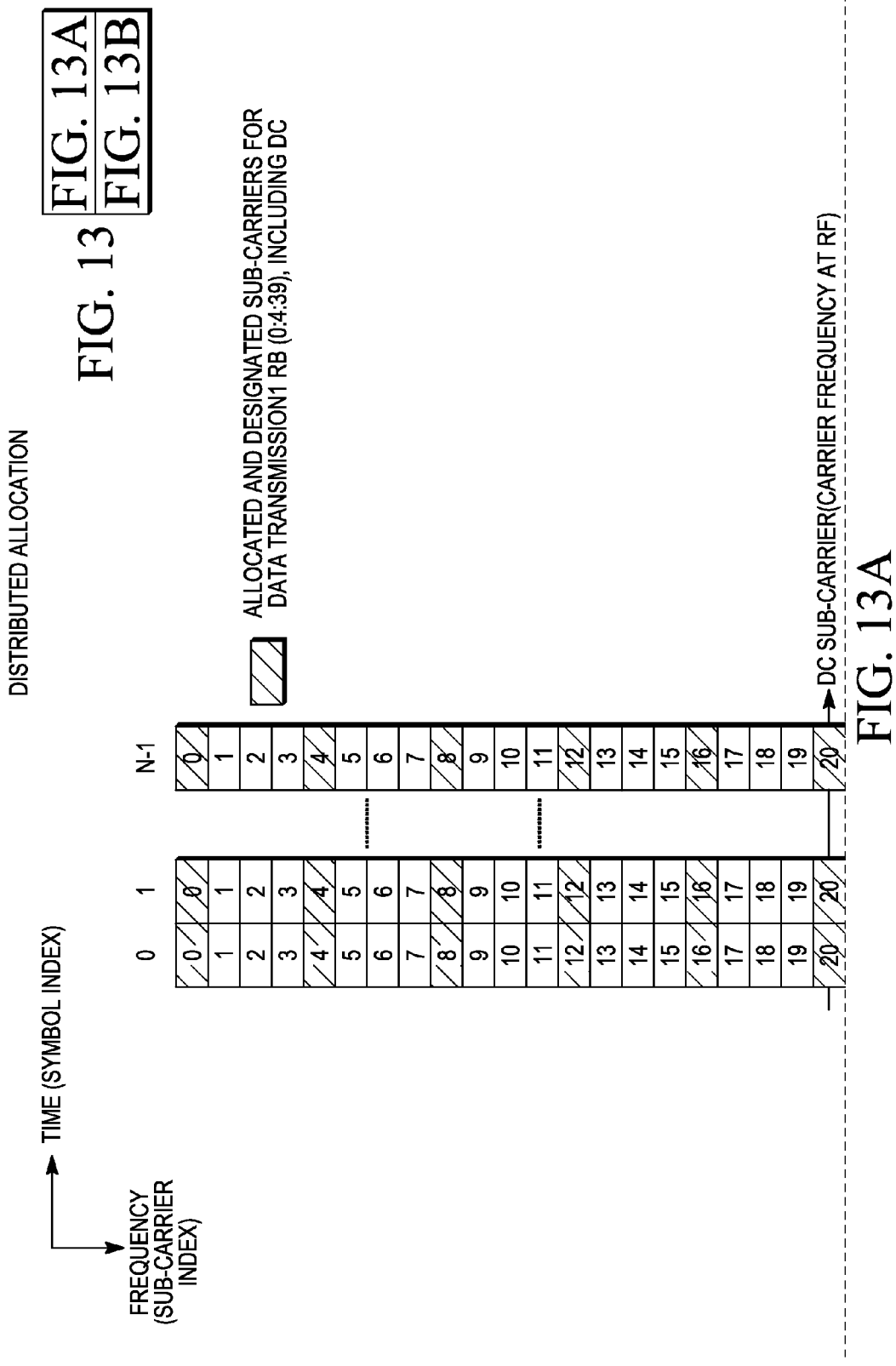

FIG.13B

ALLOCATED SUB-CARRIERS

RESOURCE ALLOCATION INCLUDING A DC SUB-CARRIER IN A WIRELESS COMMUNICATION SYSTEM

The present application is a continuation of U.S. patent application Ser. No. 11/466,345 (now U.S. Pat. No. 8,509, 323), filed Aug. 22, 2006, entitled "RESOURCE ALLOCATION INCLUDING A DC SUB-CARRIER IN A WIRELESS COMMUNICATION SYSTEM", having inventors Vijay Nangia et al., which is owned by instant assignee, and which is hereby incorporated by reference herein in its entirety for all purposes.

FIELD OF THE DISCLOSURE

The present disclosure relates generally to wireless communications, and more particularly to allocating a subset of sub-carriers from a superset including a DC sub-carrier to wireless communication terminals and also to radio resource scheduling in wireless communication networks, corresponding entities and methods.

BACKGROUND

DFT-SOFDM is an OFDM-like single carrier modulation technique that is used in the EUTRA uplink (25.814 v2.0.0). DFT-SOFDM has significantly better power de-rating, which is also known as cubic metric or peak to average power ratio (PAPR) properties than OFDM, enabling better data rates near the cell edge and/or improved battery life in subscriber stations or user equipment (UE). Unfortunately, direct conversion transmitters and receivers introduce distortion on the DC sub-carrier. On the uplink, the distortion includes unsuppressed carrier feed-through from all active user equipment in the uplink.

In 3GPP 25.814 v2.0.0, the DC sub-carrier may be used for DFT-SOFDM transmissions. Since DFT-SOFDM is a weighted sum of multiple data symbols (in contrast to conventional OFDM), degradation to the DC sub-carrier degrades receiver performance compared to an ideal DFT-SOFDM receiver with no DC distortion. At the transmitter, both error vector magnitude (EVM) and the cubic metric (CM)/PAPR worsen with increased levels of DC distortion.

In 3GPP 25.814 v2.0.0, a DC sub-carrier is provided on the OFDM downlink (DL) but it is not used for data transmission. In IEEE 802.16, a DC sub-carrier is provided on the OFDMA uplink (UL) but it is not used for data transmission. Using this same concept on the DFT-SOFDM uplink would improve receiver performance, since no spread data is mapped to the DC sub-carrier, and help EVM. However, allocations spanning the DC sub-carrier would suffer from increased CM (~1.7 dB for pi/2 BPSK, 0.7 dB for QPSK, and 0.5 dB for 16 QAM), and this would negate one of the benefits of DFT-SOFDM.

DFT-SOFDM has been proposed for the reverse link in 3 GPP2. 3GPP2 however does not discuss how to handle the DC sub-carrier with direct conversion transmitters and receivers in the system.

The various aspects, features and advantages of the disclosure will become more fully apparent to those having ordinary skill in the art upon careful consideration of the following Detailed Description and the accompanying drawings described below. The drawings may have been simplified for clarity and are not necessarily drawn to scale.

BRIEF DESCRIPTION OF THE DRAWINGS

FIGS. 4A and 4B together illustrate multiple resource blocks each of which includes multiple sub-carriers.

FIGS. 5A and 5B together illustrate multiple resource blocks including a DC sub-carrier adjacent an allocated resource block.

FIGS. 6A and 6B together illustrate multiple resource blocks including a DC sub-carrier between allocated resource blocks.

FIGS. 7A and 7B together illustrate a distributed sub-carrier allocation including a DC sub-carrier.

FIGS. 8A and 8B together illustrate another distributed sub-carrier allocation.

FIGS. 9A and 9B together illustrate another distributed sub-carrier allocation.

FIGS. 10A and 10B together illustrate multiple resource blocks including a DC sub-carrier within an allocated resource block.

FIGS. 11A and 11B together illustrate a distributed sub-carrier allocation.

FIGS. 12A and 12B together illustrate multiple resource blocks including a DC sub-carrier within an allocated resource block.

FIGS. 13A and 13B together illustrate a distributed sub-carrier allocation including a DC sub-carrier.

DETAILED DESCRIPTION

Figure 1:
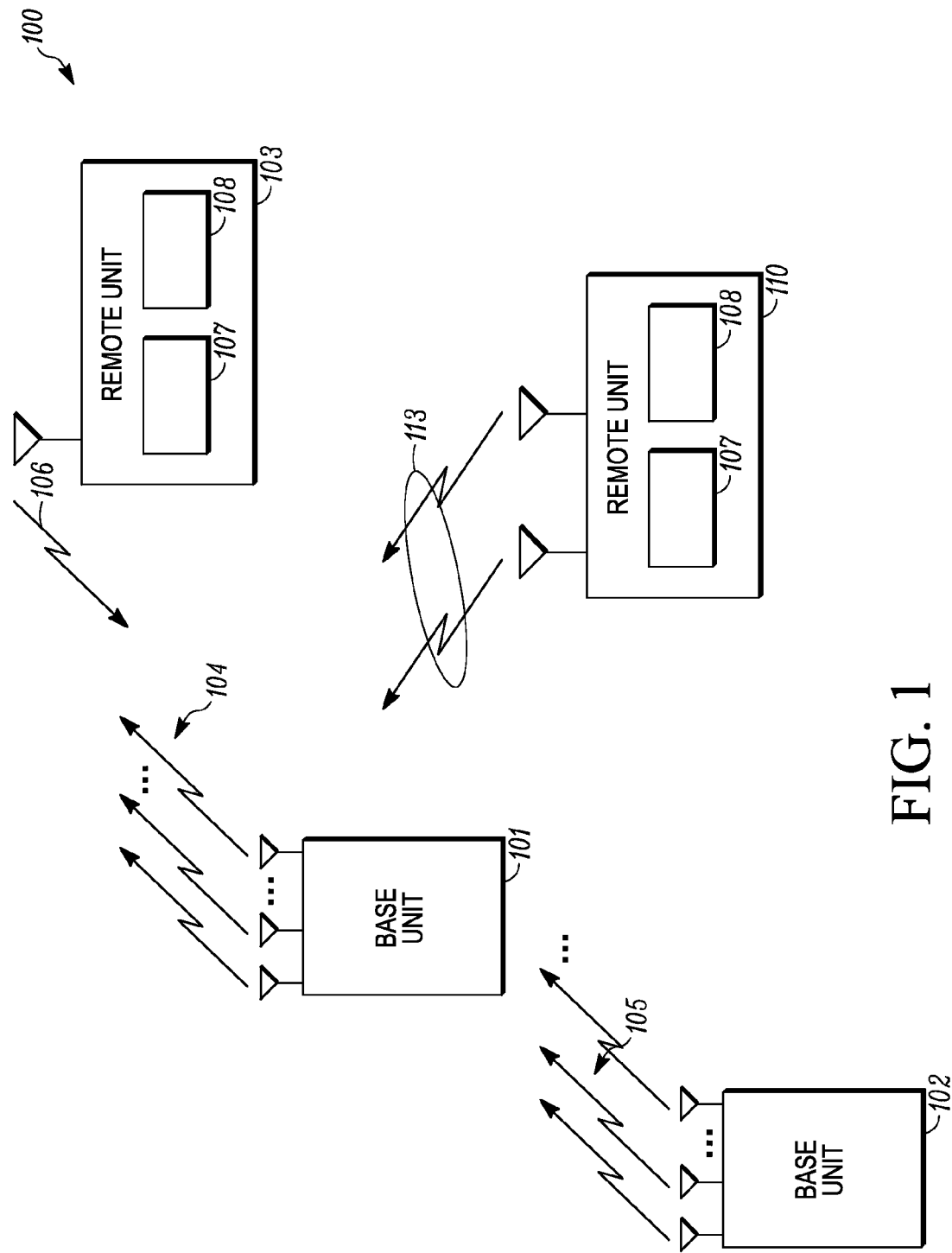
FIG. 1 illustrates a wireless communication system.

FIG. 1 is a wireless communication system 100 comprising a cellular network including multiple cell serving base stations distributed over a geographical region that utilizes pilot transmissions. In one embodiment, the communication system utilizes either OFDMA or a next generation single-carrier based FDMA architecture for uplink transmissions, such as interleaved FDMA (IFDMA), Localized FDMA (LFDMA), DFT-spread OFDM (DFT-SOFDM) with IFDMA or LFDMA.

Single-carrier based FDMA approaches are attractive in that they optimize performance when assessed using contemporary waveform quality metrics, which may include peak-to-average power ratio (PAPR) or the so-called cubic metric (CM). These metrics are good indicators of power backoff or power de-rating necessary to maintain linear power amplifier operation, where "linear" generally means a specified and controllable level of distortion both within the signal bandwidth generally occupied by the desired waveform and in neighboring frequencies. While these SC-FDMA approaches can be classified as single-carrier based transmission schemes with a much lower peak-to average power ratio than OFDM, they can also be classified as multi-carrier schemes in the present disclosure because they are block-oriented like OFDM and can be configured to occupy only a certain set of "sub-carriers" in the frequency domain like OFDM. Thus IFDMA and DFT-SOFDM can be classified as both single-carrier and multi-carrier since they have single carrier characteristics in the time domain and multi-carrier characteristics in the frequency domain. On top of the baseline transmission scheme, the architecture may also include the use of spreading techniques such as direct-sequence CDMA (DS-CDMA), multi-carrier CDMA (MC-CDMA), multi-carrier direct sequence CDMA (MC-DS-CDMA), Orthogonal Frequency and Code Division Multiplexing (OFCDM) with one or two dimensional spreading, or simpler time and/or frequency division multiplexing/multiple access techniques, or a combination of these various techniques.

Figure 2:
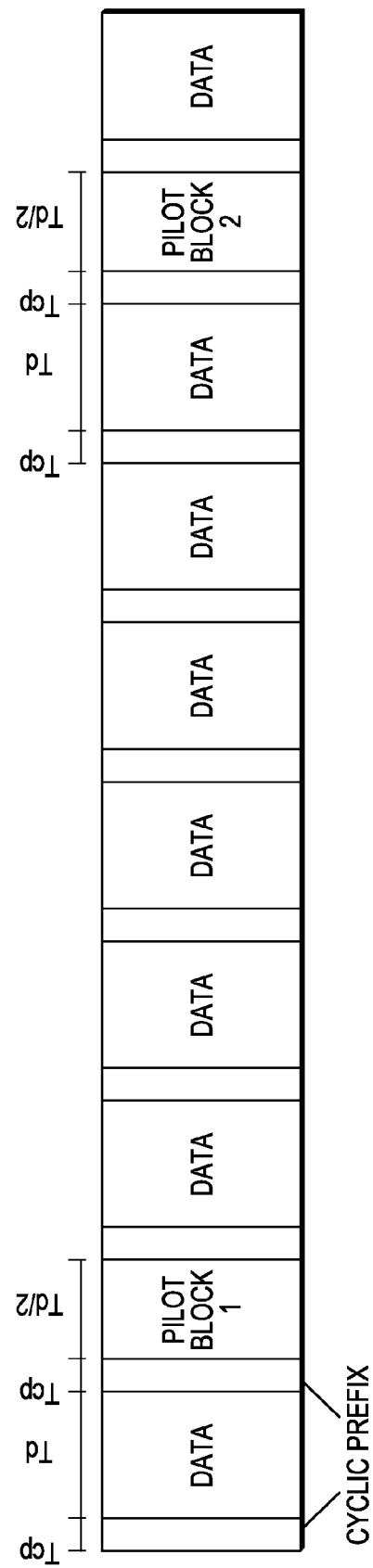
FIG. 2 illustrates an IFDMA/DFT-SOFDM pilot block and subsequent IFDMA/DFT-SOFDM data blocks for a transmission frame.

In order to retain the low PAPR or CM property of IFDMA/DFT-SOFDM, only a single IFDMA code could be transmitted by each user which leads to a time division multiplexing (TDM) of pilot or reference symbol blocks, where data and pilot signals of a particular user are not mixed within the same symbol block. This allows the low PAPR property to be preserved and also enables the pilot to remain orthogonal from the data in multi-path channels, since there is conventionally a cyclic prefix between blocks. FIG. 2 illustrates an IFDMA/DFT-SOFDM pilot block and subsequent IFDMA/DFT-SOFDM data blocks for a transmission frame or burst. Multiplexing of pilot or reference signals and lower-layer control signaling may be based on time, frequency and/or code multiplexing. TDM reference signals may have a different, such as shorter, block duration than data blocks resulting in a sub-carrier bandwidth occupied sub-carrier spacing for the pilot block that is greater than the sub-carrier bandwidth and the occupied sub-carrier spacing for the data block. In this case, if the pilot block length (excluding cyclic prefix) is $T_p$ and the data block length (excluding cyclic prefix) is $T_d$, the sub-carrier bandwidth and the occupied sub-carrier spacing for the pilot block is $T_d/T_p$ times the sub-carrier bandwidth and the occupied sub-carrier spacing for the data block, respectively. The pilot (or reference symbol) multiplexing shown in FIG. 1 is an example. Other possible configurations may have pilot and data blocks with the same data block length $T_d$, or may have no cyclic prefix present ($T_{cp}=0$), or may have different values for $T_{cp}$ on different symbols.

Figure 3:
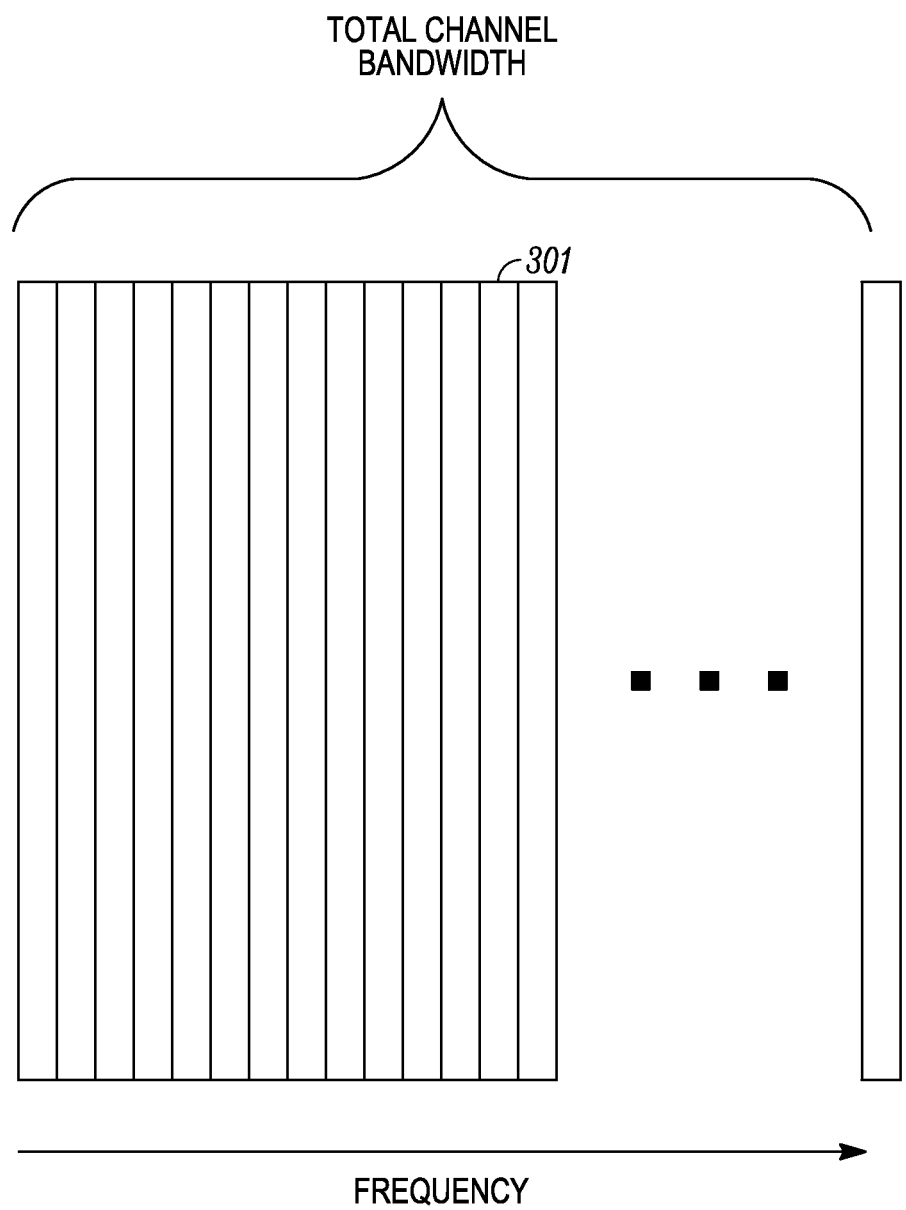
FIG. 3 illustrates a wideband channel divided into many narrow frequency bands.

As one of ordinary skill in the art will recognize, even though IFDMA and DFT-SOFDM can be seen as single-carrier-based schemes, during operation of an IFDMA system or a DFT-SOFDM system, multiple sub-carriers, e.g., 768 sub-carriers, are utilized to transmit data. In FIG. 3, a wideband channel is divided into many narrow frequency bands (sub-carriers) 301, with data being transmitted in parallel on the sub-carriers. However, a difference between OFDMA and IFDMA/DFT-SOFDM is that in OFDMA each data symbol is mapped to a particular sub-carrier, whilst in IFDMA/DFT-SOFDM a portion of each data symbol is present on every occupied sub-carrier (the set of occupied sub-carriers for a particular transmission may be either a subset or all of the sub-carriers). Hence in IFDMA/DFT-SOFDM, each occupied sub-carrier contains a mixture of multiple data symbols.

In FIG. 1, the communication system includes one or more base units 101 and 102 and one or more remote units 103 and 110. A base unit comprises one or more transmitters and one or more receivers that serve a number of remote units within a sector. The number of transmitters may be related, for example, to the number of transmit antennas at the base unit. The base units 101 and 102 communicate with remote units 103 and 110 to perform functions such as scheduling the mobile terminals to receive or transmit data using available radio resources. A base unit may also be referred to as an access point, access terminal, Node-B, or similar terminologies from the art. A remote unit comprises one or more transmitters and one or more receivers. The number of transmitters may be related, for example, to the number of transmit antennas at the remote unit. A remote unit may also be referred to as a subscriber unit, a mobile unit, user equipment, a user, a terminal, a subscriber station, user equipment (UE), a user terminal or similar terminologies from the art. As known in the art, the entire physical area served by the communication network may be divided into cells, and each cell may comprise one or more sectors. The network also comprises management functionality including data routing, admission control, subscriber billing, terminal authentication, etc., which may be controlled by other network entities, as is known generally by those having ordinary skill in the art. When multiple antennas are used to serve each sector to provide various advanced communication modes (e.g., adaptive beam-forming, transmit diversity, transmit SDMA, and multiple stream transmission, etc.), multiple base units can be deployed. These base units within a sector may be highly integrated and may share various hardware and software components. For example, all base units co-located together to serve a cell can constitute what is traditionally known as a base station. Base units 101 and 102 transmit downlink communication signals 104 and 105 to serving remote units on at least a portion of the same resources (time and/or frequency). Remote units 103 and 110 communicate with one or more base units 101 and 102 via uplink communication signals 106 and 113.

In FIG. 1, while only two base units and two remote units, one of ordinary skill in the art will recognize that typical communication systems comprise many base units in simultaneous communication with many remote units. It should also be noted that while the disclosure is described primarily for the case of uplink transmission from a mobile unit to a base station, the invention is also applicable to downlink transmissions from base stations to mobile units, or even for transmissions from one base station to another base station, or from one mobile unit to another. A base unit or a remote unit may be referred to more generally as a communication unit.

Generally, a wireless communication network infrastructure scheduling entity located, for example, in a base station 101, 102 in FIG. 1, allocates or assigns radio resources to wireless communication entities, e.g., mobile terminals, in the wireless communication network. In FIG. 1, the base stations 101, 102 each include a scheduler for scheduling and allocating resources to mobile terminals in corresponding cellular areas. In multiple access schemes such as those based on OFDM methods, multi-carrier access or multi-channel CDMA wireless communication protocols including, for example, IEEE-802.16e-2005, multi-carrier HRPD-A in 3GPP2, and the long term evolution of UTRA/UTRAN Study Item in 3GPP (also known as evolved UTRA/UTRAN (EUTRA/EUTRAN)), scheduling may be performed in the time and frequency dimensions using a Frequency Selective (FS) scheduler. To enable FS scheduling by the base station scheduler, in some embodiments, each mobile terminal provides a per frequency band channel quality indicator (CQI) to the scheduler.

In OFDM systems or OFDM like systems such as DFT-SOFDM and IFDMA, a resource allocation is the frequency and time allocation that maps information for a particular UE to sub-carrier resources from a set of available sub-carriers, wherein the available sub-carriers may include a DC sub-carrier, as determined by the scheduler. The DC sub-carrier is defined to be the sub-carrier that is within a sub-carrier separation distance of the radio frequency carrier frequency. In some embodiments, the DC sub-carrier would be substantially within ½ a sub-carrier separation distance of the radio frequency (RF) carrier frequency. A sub-carrier separation distance is the distance between two consecutive sub-carriers. For uniformly separated sub-carriers the sub-carrier separation distance would be the same for each pair of consecutive sub-carriers. In the case where DC distortion, which occurs at the carrier frequency at RF, does not align exactly with the transmitted sub-carriers then the term "DC sub-carrier" refers to DC distortion at the carrier frequency at RF, rather than a sub-carrier that could potentially be used for transmission. In one embodiment, the "radio frequency carrier frequency" is defined with respect to the wireless communications device transmitter. In another embodiment, for the purpose of DC sub-carrier definition, the radio carrier frequency can be either the radio carrier frequency of a transmitting device or a receiving device. Normally, if the transmitting device and receiving device are operating with the same bandwidth on the same communication channel, the radio carrier frequency of the transmitter and receiver will be substantially the same. However, if the transmitter and receiver are operating with differing bandwidths, the receiver will have a receiver-associated DC sub-carrier associated with its radio carrier frequency, and optionally may be considered to have an additional transmitter-associated DC sub-carrier associated with the radio carrier frequency of the transmitter.

The resource allocation may depend, for example, on the frequency-selective channel-quality indication (CQI) reported by the UE to the scheduler. The channel-coding rate and the modulation scheme, which may be different for different portions of the sub-carrier resources, are also determined by the scheduler and may also depend on the reported CQI. In some applications, the UE may not be assigned consecutive sub-carriers. For example, it could be assigned every Qth sub-carrier (equally spaced, non-consecutive) of the entire portion or a portion of the available system sub-carriers to improve frequency diversity. The available system sub-carriers not including the DC sub-carrier may be grouped into one or more resource blocks (RB) wherein each resource block comprises the same (common) number of sub-carriers. Further, one of the resource blocks may comprise the DC sub-carrier to form an expanded resource block, wherein the expanded resource block includes at least one more sub-carrier than non-expanded resource blocks. A resource assignment to a UE can be a resource block or a fraction thereof. More generally, a resource assignment or allocation is a fraction of multiple resource blocks.

Figure 4B:
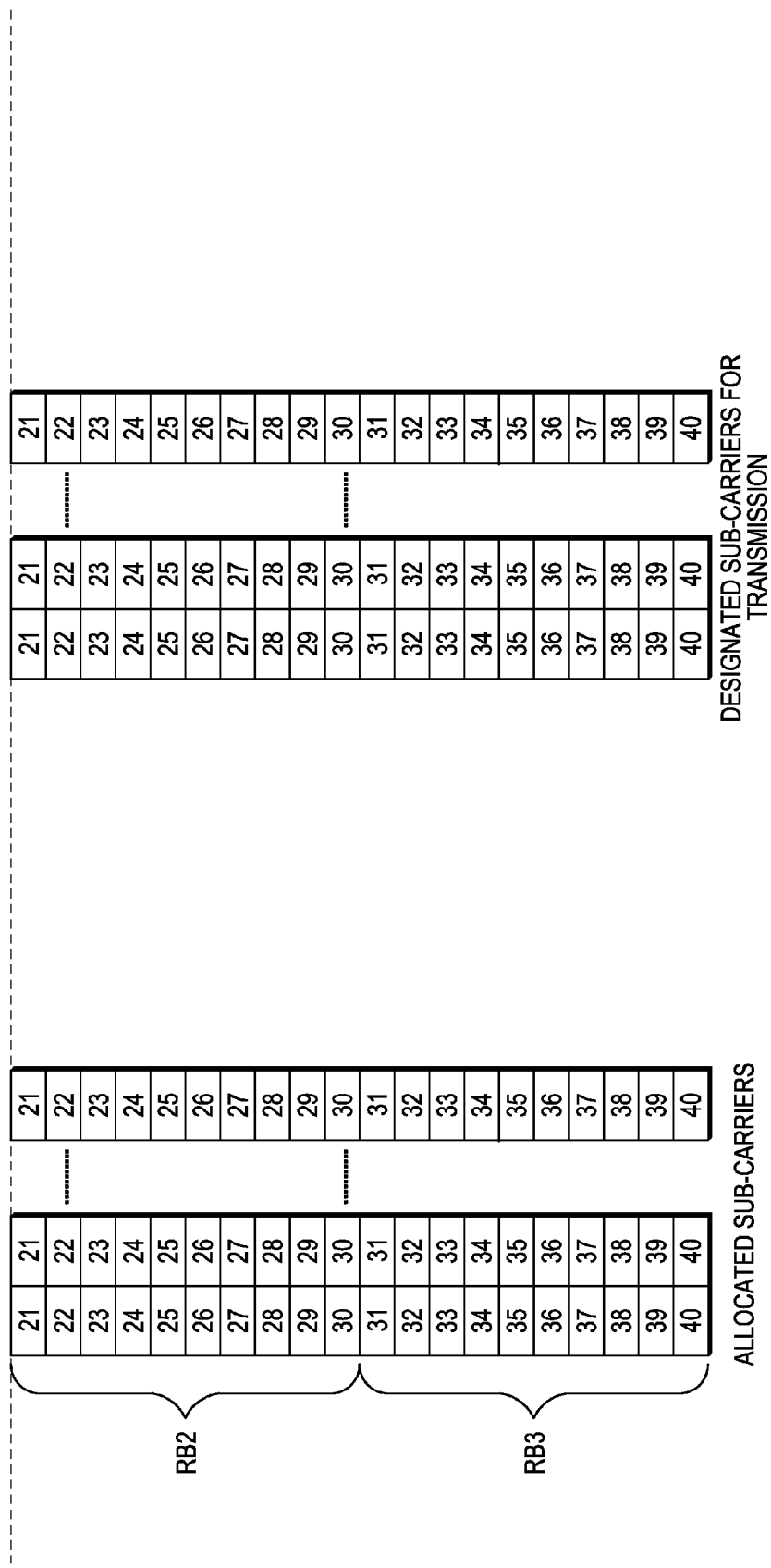

In one embodiment, shown in FIGS. 4A and 4B, a wireless communication terminal is allocated an expanded resource block comprising resource block RB1 (sub-carrier indexes 10 to 19) and the DC sub-carrier (index 20) from the available total of 41 sub-carriers. In this example, the sub-carriers of a resource block are consecutive and the size of a resource block is 10 sub-carriers. A total of 4 resource blocks (RB0-3) are available for allocation. The DC sub-carrier is located at the edge of the expanded resource block. In order to mitigate the effects of DC sub-carrier distortion due to local oscillator leakage, all of the sub-carriers of RB1 except the DC sub-carrier are designated for transmission leaving the DC sub-carrier unused. Optionally, in this and other embodiments, a small number of additional sub-carriers may be left unused near the DC sub-carrier to further ensure distortion mitigation, which may be useful if the sub-carrier spacing of the system is particularly small. The information is preferably modulated on one or more of the designated sub-carriers using DFT-SOFDM or some other modulation scheme. The information may consist of data, control, pilot signals, access signals, etc., or various combinations thereof. In FIGS. 4A and 4B, the sub-carriers of the resource allocation are consecutive resulting in a so called "localized allocation" and the information is transmitted on consecutive sub-carriers of the one or more designated sub-carriers.

Figure 5B:
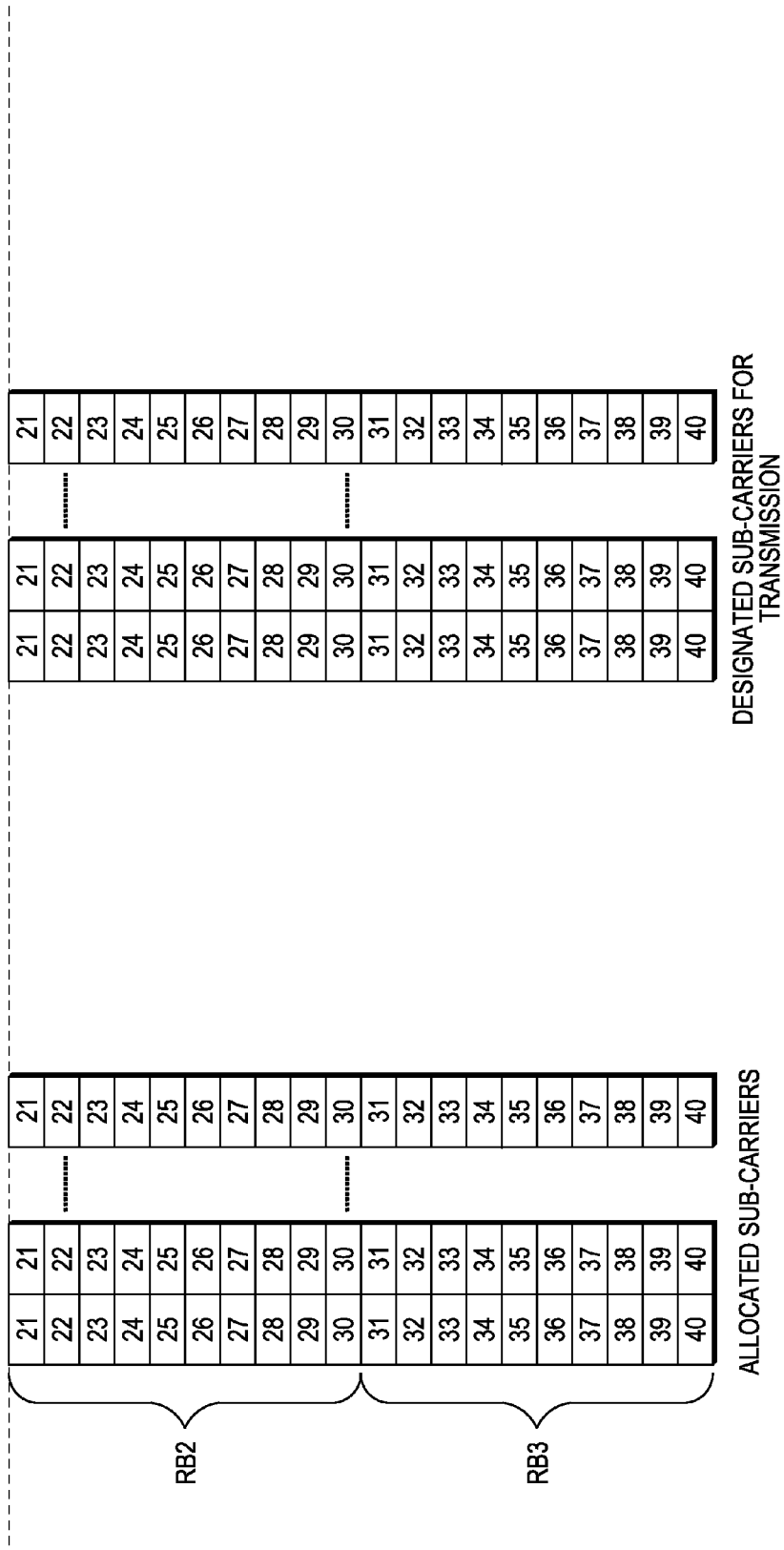

In another embodiment, shown in FIGS. 5A and 5B, a UE is allocated a localized allocation consisting of RB0 (sub-carrier indexes 0 to 9). Since, the DC sub-carrier (index 20) is not between any two sub-carriers of the allocation, all of the sub-carriers (0 to 9) except the DC sub-carrier are designated for transmission.

Figure 6B:
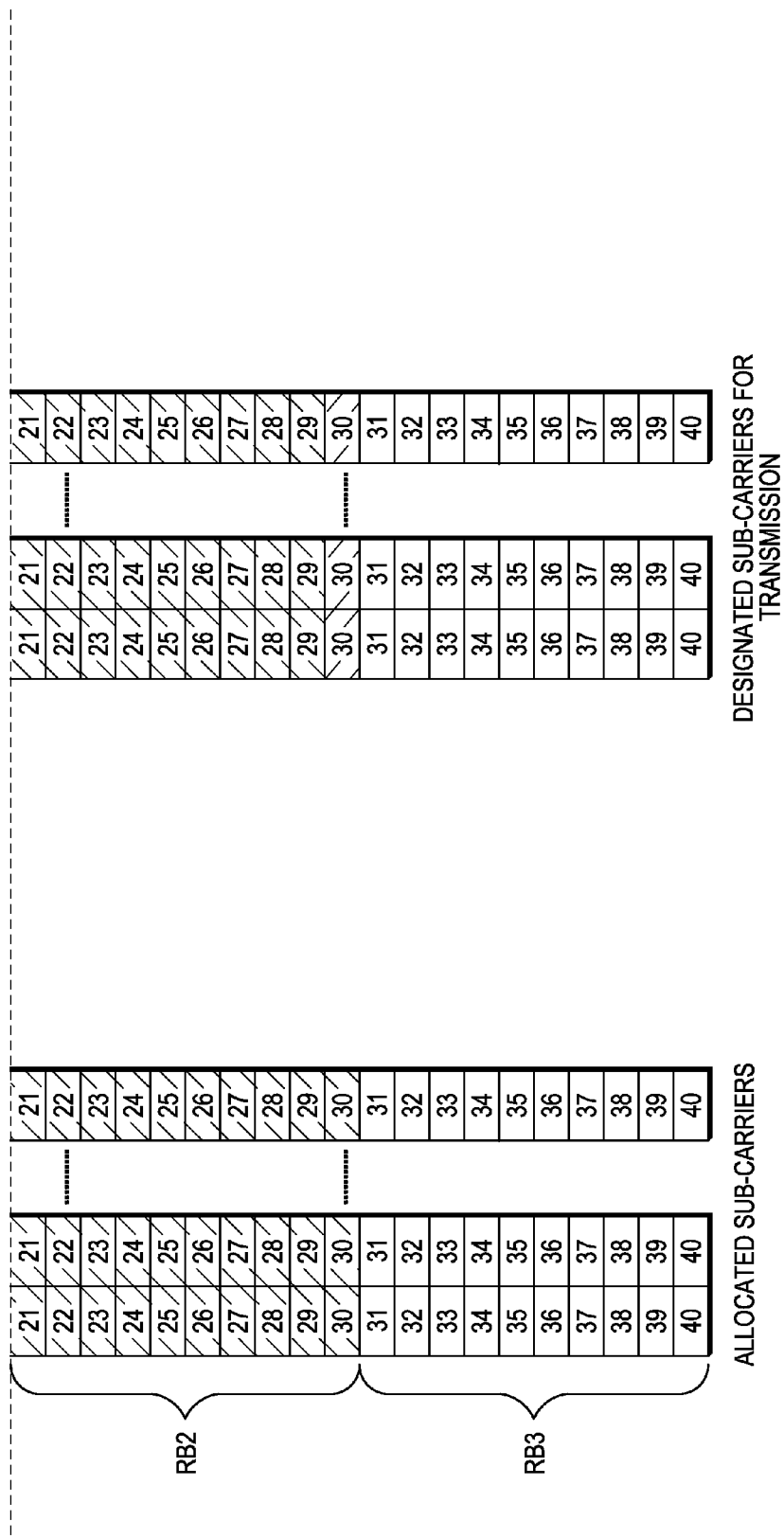

In another embodiment, shown in FIGS. 6A and 6B, a UE is allocated two resource blocks, RB1 (sub-carrier indexes 10-19) and RB2 (indices 21-30). In this embodiment, the DC sub-carrier (index 20) is between the two resource blocks. In other words, the DC sub-carrier is between any two sub-carriers of the allocation. Alternatively, the allocation consists of an expanded resource block comprising resource block 1 (indexes 10 to 19) and the DC sub-carrier (index 20), and the non-expanded resource block RB2 (indexes 21 to 30) adjacent to the DC sub-carrier. In this example, the sub-carriers of a resource block are consecutive and the resource block includes 10 sub-carriers. In order to maintain the low PAPR/CM for IFDMA/DFT-SOFDM transmission, the UE designates for transmission the DC sub-carrier and all but one edge-most sub-carrier of the resource allocation. In this example, the UE designates sub-carrier indexes 10-29 for localized transmission leaving the sub-carrier 30 unused. In another embodiment, the UE may not modulate information on the designated DC sub-carrier and/or may puncture the DC sub-carrier prior to transmission. Optionally, in this and other embodiments, a small number of additional sub-carriers may be left unused near the unused edge-most sub-carrier of the resource allocation.

In another embodiment not shown in FIGS. 4A and 4B, additional reserved sub-carriers may be defined in between one or more of resource blocks of a number of sub-carriers (i.e., not necessarily around the radio frequency carrier frequency). If the resource allocation spans the DC sub-carrier or one or more reserved sub-carriers, the designated sub-carriers will include these DC and/or reserved sub-carriers, and will not include that number of edgemost sub-carriers of the radio resource allocation comprising a plurality of sub-carriers. For example, the available sub-carriers may have a number of reserved sub-carriers, and if the reserved sub-carrier is between any two sub-carriers of the allocation, the reserved sub-carrier is designated for transmission. Additionally, optionally, in this and other embodiments, the unused sub-carrier, sub-carriers with no information modulated and/or punctured sub-carrier may be used for other purposes such as but not restricted to PAPR/CM reduction, pilot sub-carrier etc. or various combinations thereof.

In yet another embodiment, if a DFT of size 21 is available then the sub-carriers on indexes 10-30, e.g., number of resource blocks +1 additional sub-carrier, are designated for localized transmission.

Figure 7B:
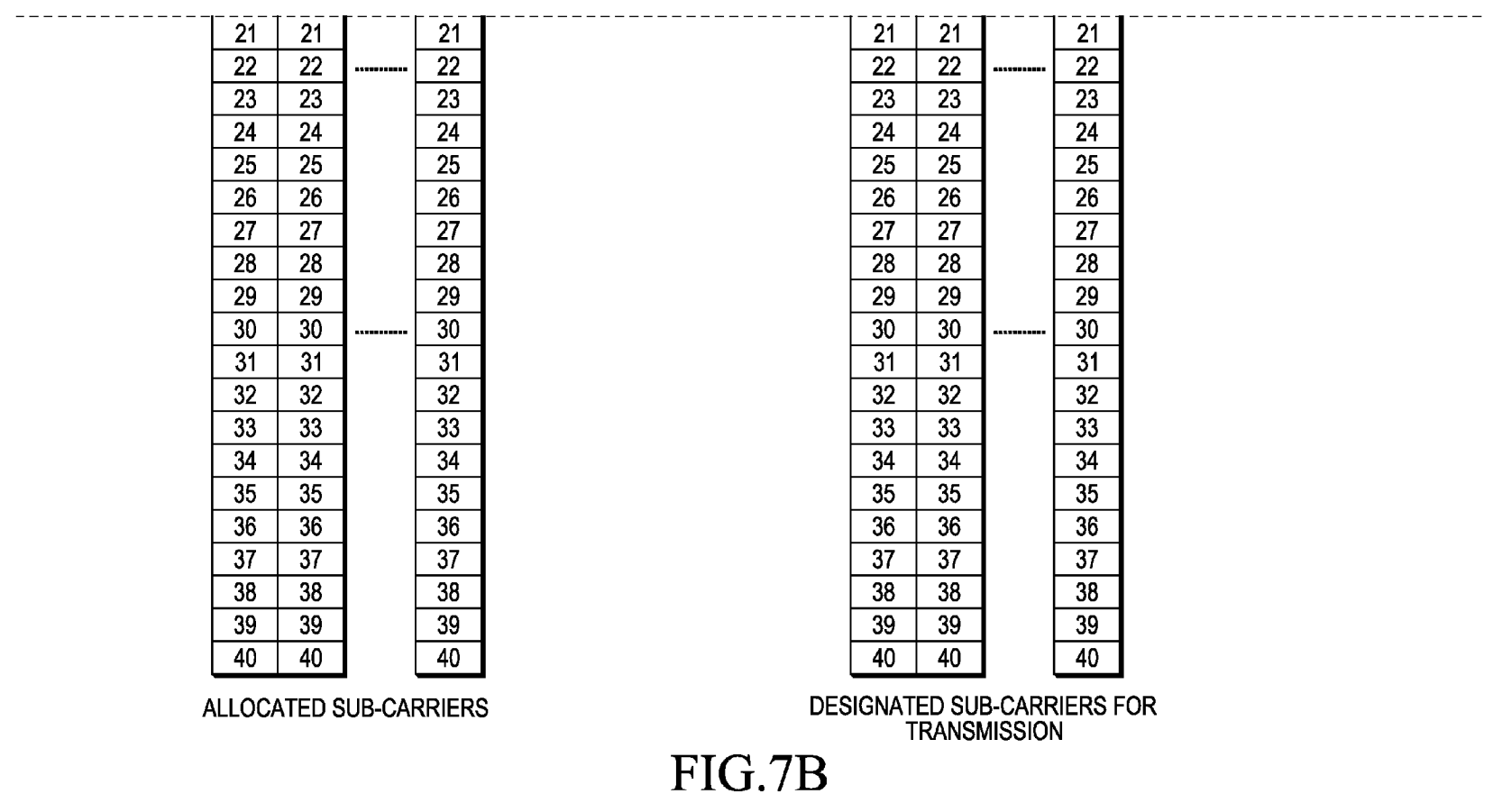

In another embodiment, shown in FIGS. 7A and 7B, a distributed allocation is assigned to the UE. One way to specify the distributed sub-carriers assigned is to specify the sub-carrier offset index S, the repetition factor R (or the sub-carrier decimation factor or skip factor), and the index of the last sub-carrier allocated B. The parameters are similar to a B-sub-carrier OFDM modulator, with sub-carrier mapping of evenly-spaced sub-carriers with spacing of R sub-carriers with a sub-carrier offset of S for a DFT-SOFDM signal. These can be written as an ordered triplet: (S, R, B). In FIGS. 7A and 7B, the distributed allocation assigned is (0, 2, 20) and includes the DC sub-carrier. The DC sub-carrier is located at the edge of the resource allocation. Since, the DC sub-carrier (index 20) is not between any two sub-carriers of the allocation, all of the sub-carriers except the DC sub-carrier are designated for transmission. Thus the DC sub-carrier 20 is unused. In FIGS. 7A and 7B, information is transmitted on evenly-spaced non-consecutive sub-carriers of the one or more designated sub-carriers resulting in a distributed transmission.

Figure 8B:
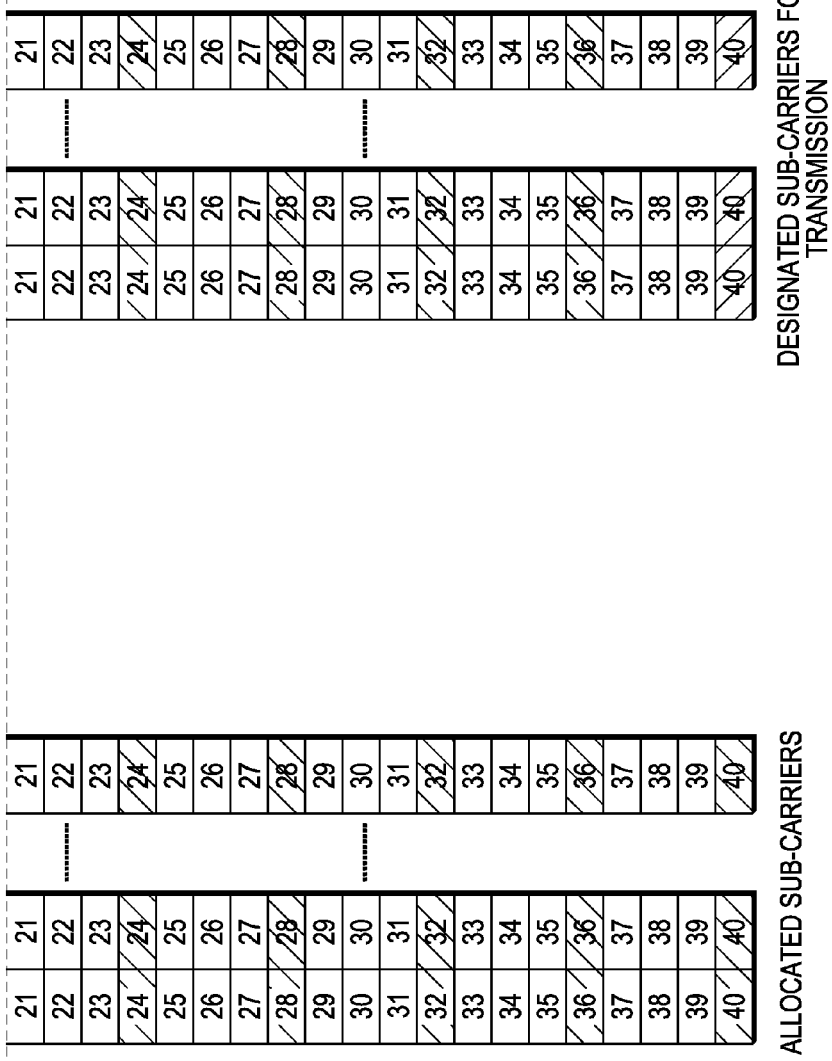

In another embodiment, shown in FIGS. 8A and 8B, a distributed allocation (0, 4, 40) is assigned to the UE. This allocation includes the DC sub-carrier 20, which is between any two sub-carriers of the allocation. In order to maintain a low PAPR/CM for IFDMA/DFT-SOFDM transmission, the DC sub-carrier and all but one edge-most sub-carrier of the resource allocation are designated for transmission. For example, the sub-carrier 40 may be unused.

Figures 9, 9A, 9B:
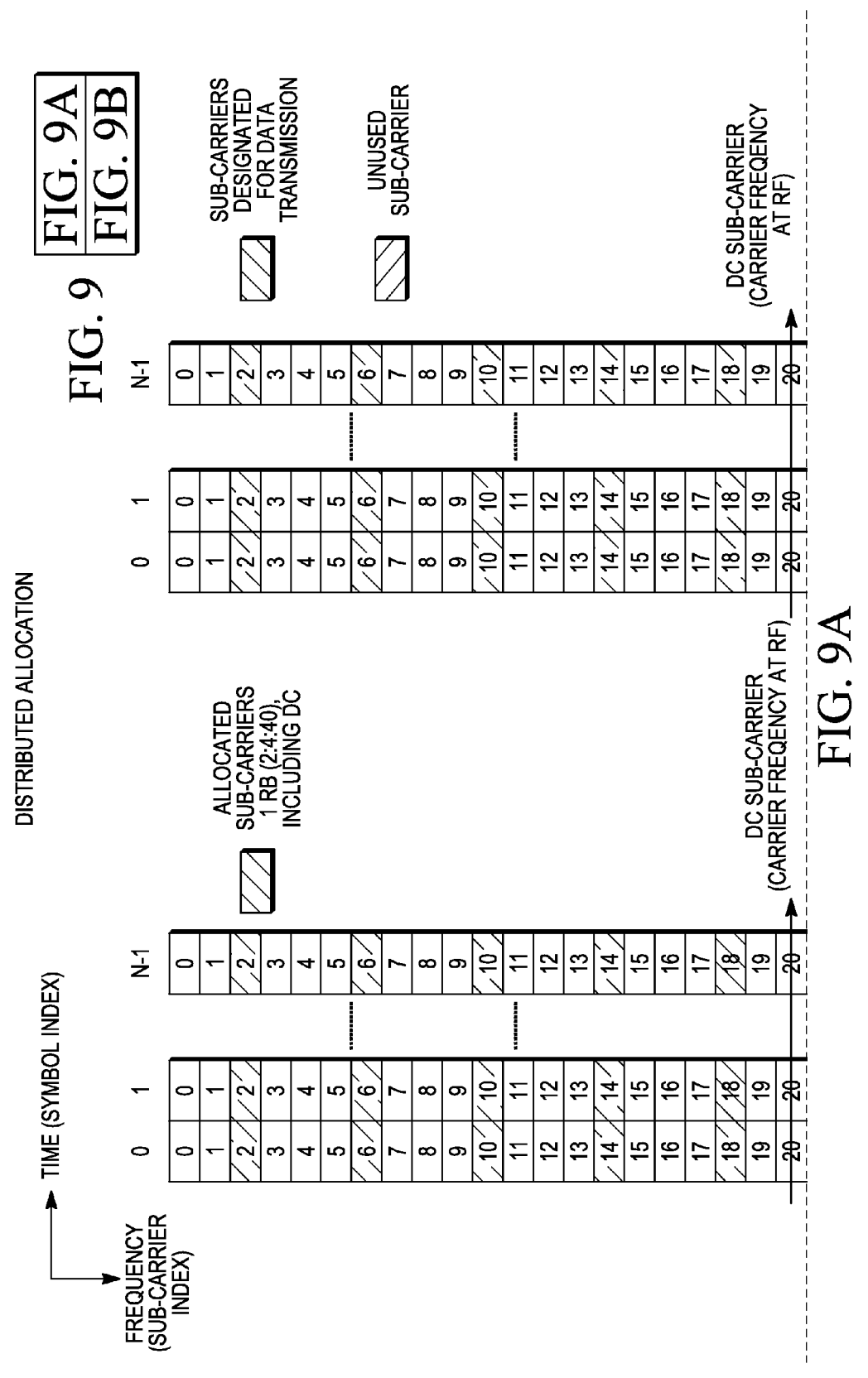
Figure 9B:
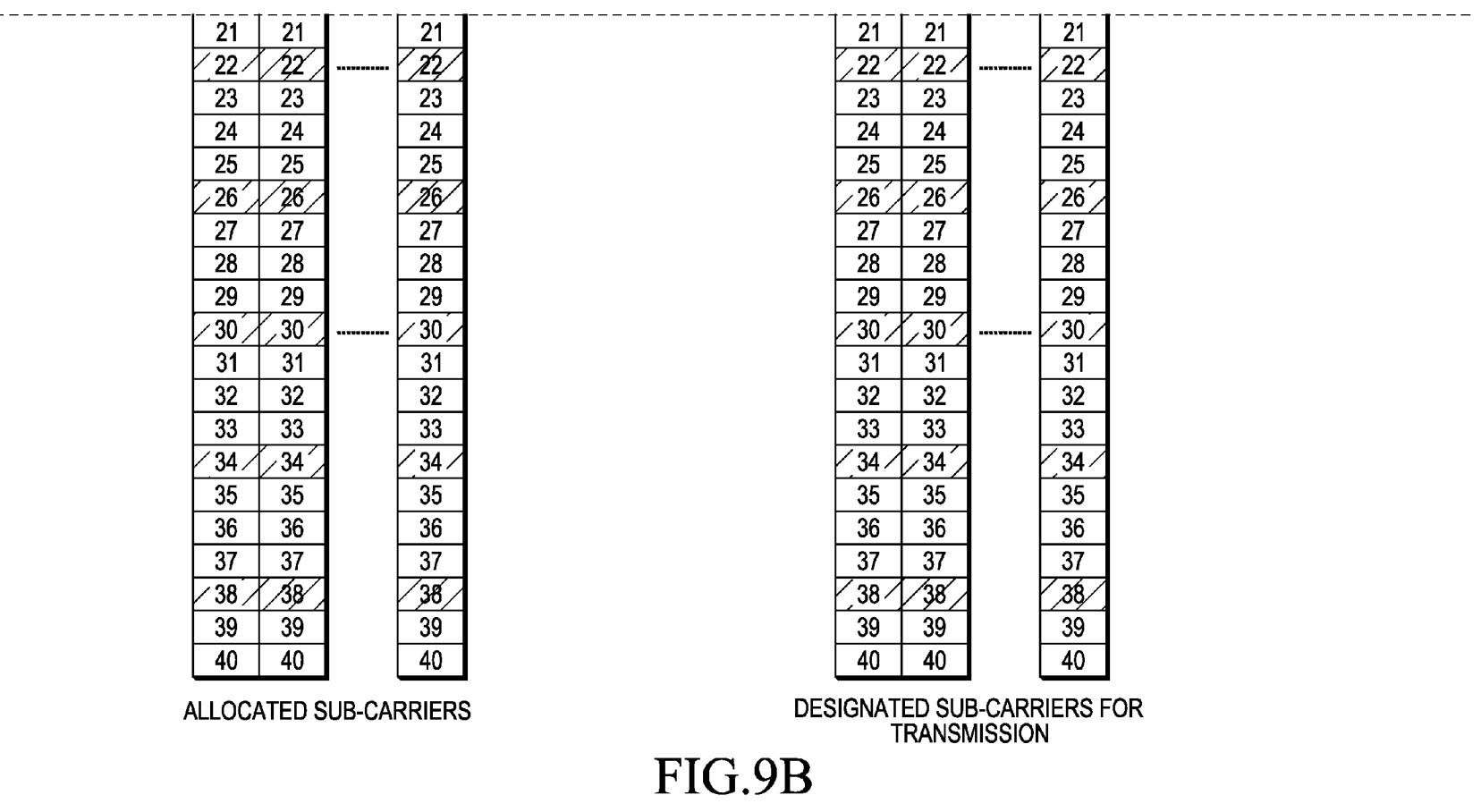

In another embodiment, shown in FIGS. 9A and 9B, a distributed allocation is assigned to the UE. This allocation does not include the DC sub-carrier, 20. In order to maintain the low PAPR/CM for IFDMA/DFT-SOFDM transmission, all sub-carriers of the resource allocation are designated for transmission. In this example, the transmitted information is distributed on evenly-spaced non-consecutive sub-carriers of the one or more designated sub-carriers resulting in a distributed transmission.

In the above examples, uplink sounding (for channel dependent scheduling) can take into account that allocations are preferably not done so as to span DC, such as by sounding at least a portion of the bandwidth on either side of the DC sub-carrier. At the receiver, since allocations that do not span DC may perform better, restrictions on the scheduler may also help mitigate any possible degradation from DC sub-carrier distortion due to local oscillator leakage.

Figure 10B:
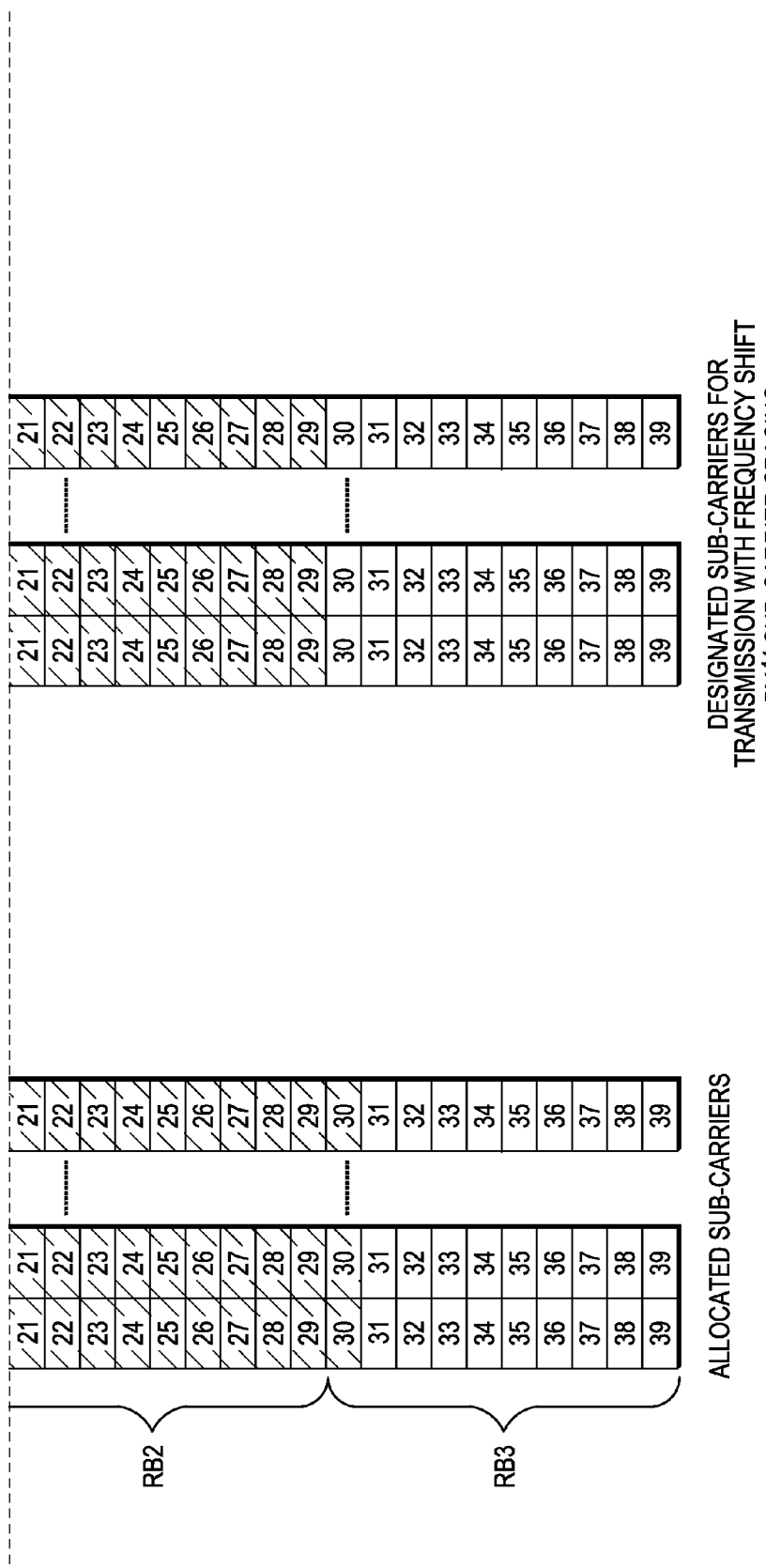

In another embodiment, shown in FIGS. 10A and 10B, the DC sub-carrier is included as one of the sub-carriers of the resource block RB2 and a UE is allocated a localized allocation comprising RB1 and RB2 for transmission. In this embodiment, the transmitted signal is frequency shifted by a fraction of the sub-carrier spacing, for example, ½ the sub-carrier spacing, prior to transmission resulting in no data modulated exactly on the DC sub-carrier (carrier frequency at RF). That is, the carrier frequency of the wireless communication device does not coincide with the nominal center frequency of a sub-carrier of the allocated resource blocks. Thus, the impact of the DC distortion due to local oscillator leakage is distributed over sub-carriers adjacent to the DC sub-carrier instead of being concentrated on the DC sub-carrier without any frequency shift. In FIGS. 10A and 10B, the allocated sub-carriers corresponding to RB1 and RB2 are frequency shifted by ½ the sub-carrier spacing. For a transmission frame or burst format including different block lengths, e.g., half-length short blocks (SB) multiplexed with full-length long blocks (LB) having different sub-carrier spacings, the frequency shift may be different for SB and LB. In other embodiments, it may be desirable to keep the absolute frequency shift constant (in Hz) and select different fraction values on the SB and LB, for example, ½ sub-carrier spacing on LB and ¼ sub-carrier spacing on SB.

In another embodiment, in FIGS. 11A and 11B, a UE is allocated a distributed allocation (0, 4, 36). In this embodiment, the distributed signal is frequency shifted by a fraction, e.g., ½, of a sub-carrier spacing prior to transmission resulting in no data modulated exactly on the DC sub-carrier (carrier frequency at RF).

Figure 12B:
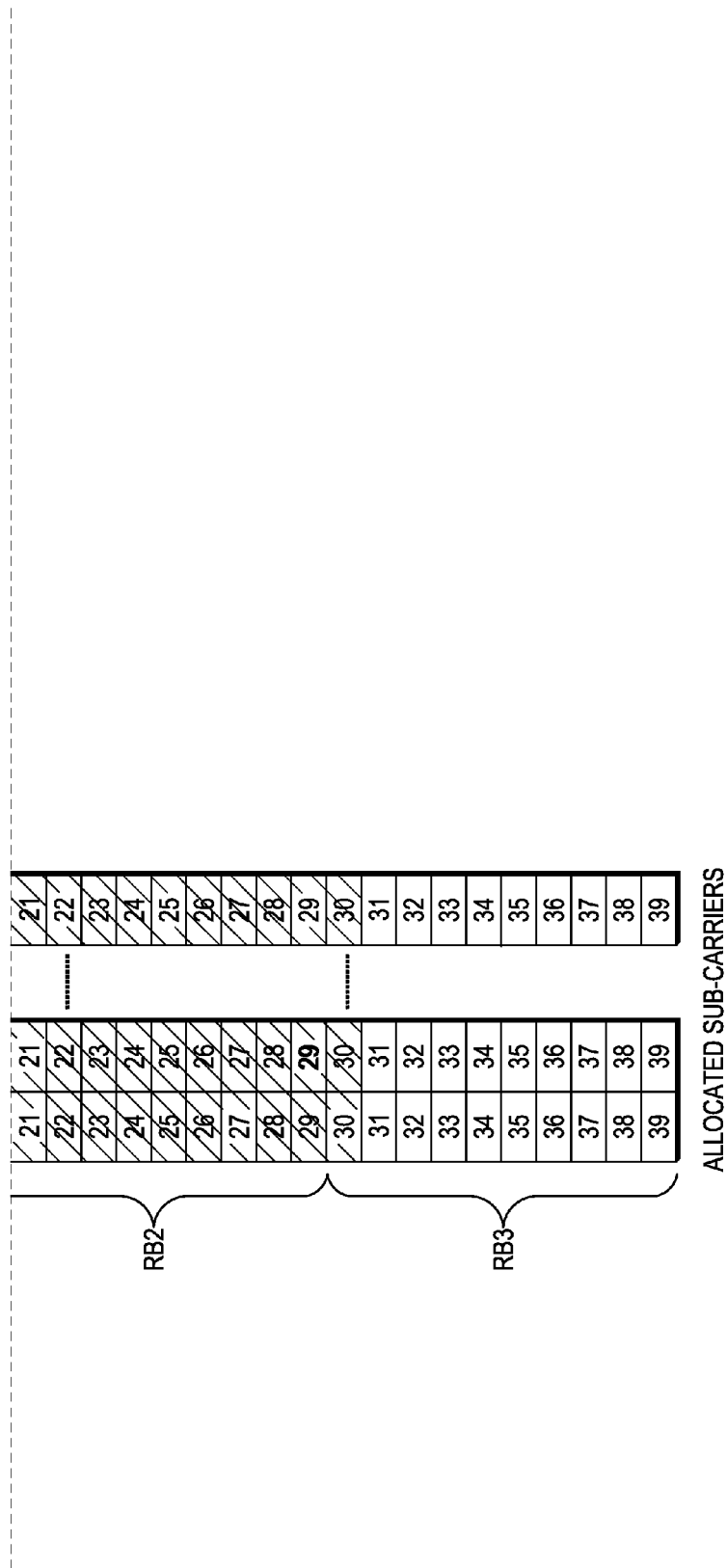
Figure 13B:
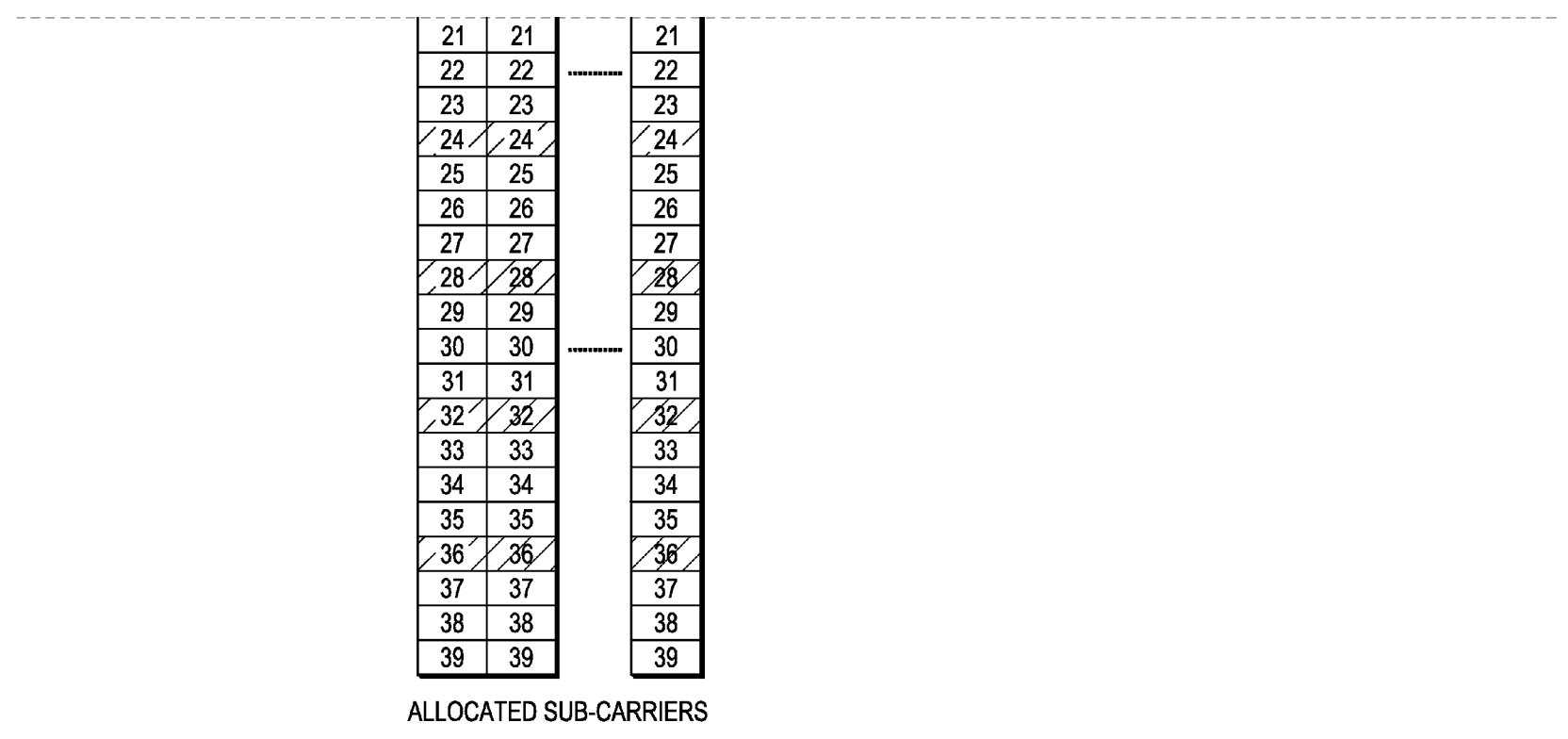

In another embodiment, the radio resource is allocated based on a condition of the wireless communication terminal or the radio resource allocation satisfies a minimum size requirement if the radio resource allocation includes a sub-carrier within a sub-carrier distance of the radio frequency carrier frequency. In a more specific embodiment, the condition is satisfied when the radio resource allocation includes a sub-carrier within ½ the sub-carrier distance of the radio frequency carrier frequency called the DC sub-carrier. In FIGS. 12A, 12B, 13A, and 13B, the DC sub-carrier is included as one of the sub-carriers of resource block RB2, called a DC resource block. In FIGS. 12A and 12B, a UE is allocated a localized allocation comprising RB1 and RB2. In FIGS. 13A and 13B, a UE is allocated a distributed transmission including the DC sub-carrier. Since the allocation includes the DC sub-carrier then the DC distortion due to local oscillator leakage is expected to degrade the performance of the allocation. There are at least two scheduling techniques that may limit this degradation. The first is to advantageously select the UE that includes the DC sub-carrier in order to overcome degradation due to DC distortion. Such a selection may be based on allocating the resource allocation to one of a plurality of wireless communication terminals on the condition that it is not power limited. For example, a group of resource blocks including DC may be allocated when a maximum power level of the UE is higher than a power controlled power level of the UE. The selection may also be based on the condition on whether the UE has significant DC suppression in its transmitter, where a group of resource blocks including DC may be allocated to the UE with significant DC suppression in its transmitter. The UE capability or class with such suppression capability may be previously signaled to the serving communication network, such as whether or not the terminal has significant DC suppression in its transmitter.

A second scheduling technique is to impose limits on the minimum size of an allocation that may limit degradation when the allocation includes the DC sub-carrier. If allocations are made in terms of numbers of resource blocks, the minimum size of a group of resource blocks allocated may be determined by whether the group includes the DC resource block and the location of the DC sub-carrier within the group. In one embodiment, the minimum number of resource blocks in a group containing the DC resource block may be chosen to be larger than a threshold N1 when the DC sub-carrier is adjacent to more than one of the plurality of sub-carriers and N2 when the DC sub-carrier is adjacent to not more than one of the plurality of sub-carriers. N2 may be conditioned on whether a maximum power level of the schedulable wireless communication terminal resulting from the allocation is higher than a power controlled power level of the schedulable wireless communication terminal. N1 or N2 may also be conditioned on resource block size (e.g., 12 sub-carriers, 15 sub-carriers, or 25 sub-carriers).

Figure 14:
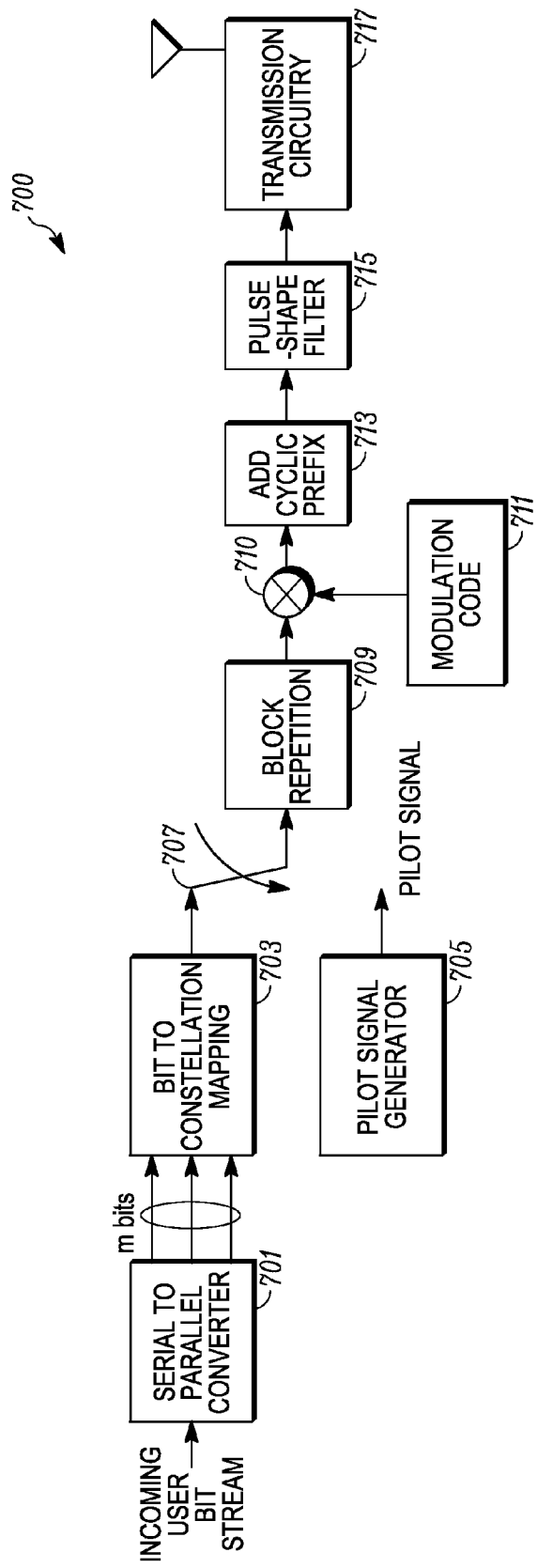
FIG. 14 is a block diagram of an IFDMA transmitter.

FIG. 14 is a block diagram of an IFDMA transmitter 700 capable of performing time-domain signal generation. In operation, incoming data bits are received by serial to parallel converter 701 and output as m-bit streams to constellation mapping circuitry 703. A switch 707 receives either a pilot signal (sub-block) from pilot signal generator 705 or a data signal (sub-block) from mapping circuitry 703 of sub-block length, Bs. The length of the pilot sub-block may be smaller or larger than that of the data sub-block. Regardless of whether a pilot sub-block or data sub-block are received by sub-block repetition circuitry 709, circuitry 709 performs sub-block repetition with repetition factor $R_d$ on the sub-block passed from switch 707 to form a data block of block length B. Data block and a modulation code 711 are fed to a modulator 710. Thus, the modulator 710 receives a symbol stream (i.e., elements of a data block) and an IFDMA modulation code (sometimes referred to as simply a modulation code). The output of modulator 710 comprises a signal existing at certain evenly-spaced frequencies, or sub-carriers, wherein the sub-carriers having a specific bandwidth. The actual sub-carriers utilized are dependent on the repetition factor $R_d$ of the sub-blocks and the particular modulation code utilized. The sub-block length $B_s$, repetition factor $R_d$, and modulation code can also be changed over time. Changing the modulation code changes the set of sub-carriers, so changing the modulation code is equivalent to changing $S_d$. Varying the block length B varies the specific bandwidth of each sub-carrier, with larger block lengths having smaller sub-carrier bandwidths. While changing the modulation code will change the sub-carriers utilized for transmission, the evenly-spaced nature of the sub-carriers remain. Thus, a sub-carrier changing pilot pattern is achieved by changing the modulation code. In one embodiment, the modulation code is changed at least once per burst. In another embodiment, the modulation code is not changed in a burst. A cyclic prefix is added by circuitry 713 and pulse-shaping takes place via pulse-shaping circuitry 715. The resulting signal is transmitted via transmission circuitry 717.

Figure 15:
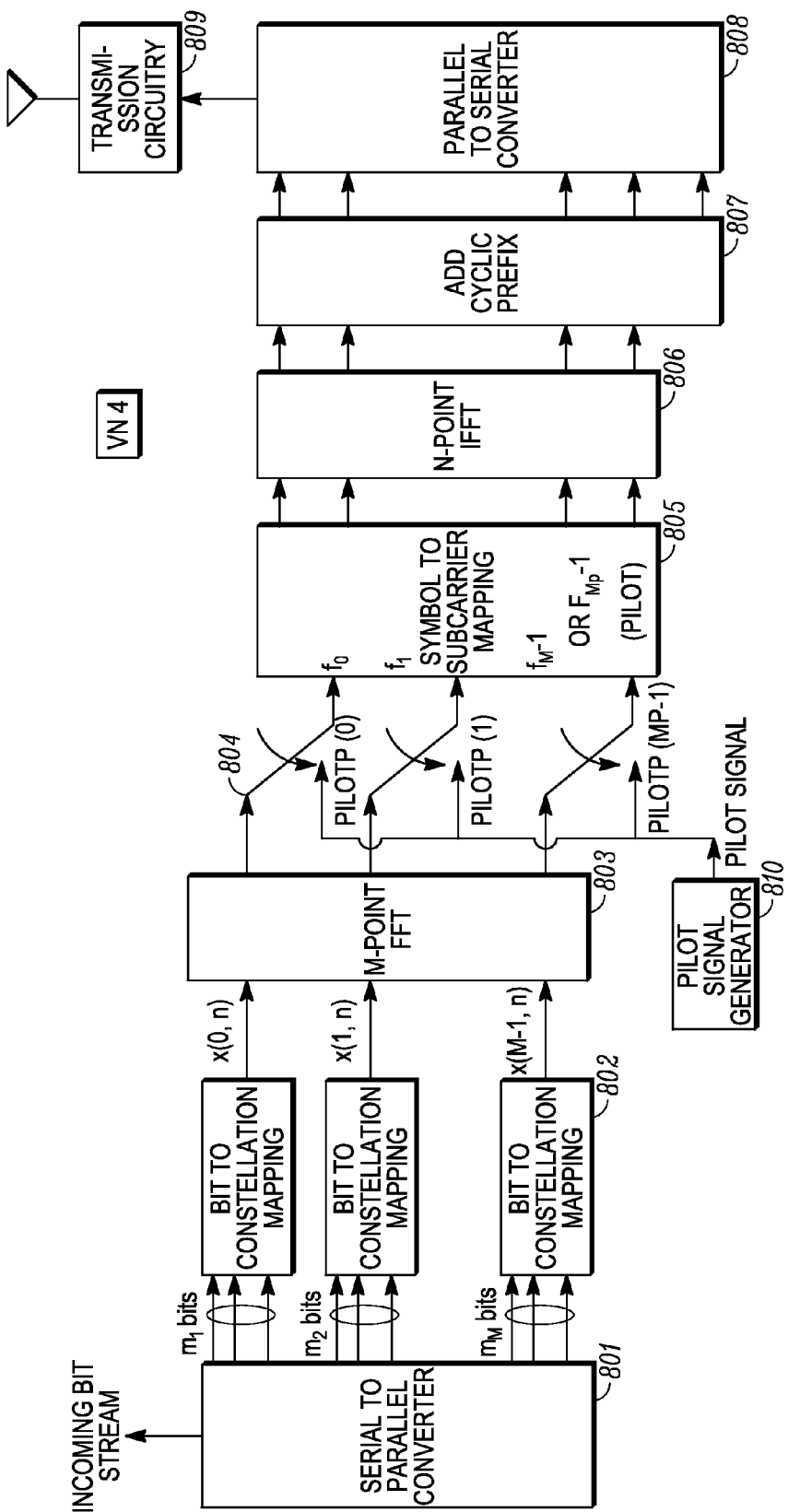
FIG. 15 is a block diagram of a DFT-SOFDM transmitter.

FIG. 15 is a block diagram of DFT-SOFDM transmitter 800 used to transmit pilots and data in the frequency. Blocks 801, 802 and 806-809 are similar to a conventional OFDM/OFDMA transmitter, while blocks 803 and 805 are unique to DFT-SOFDM. As with conventional OFDM, the IDFT size (or number of points, N) is typically larger than the maximum number of allowed non-zero inputs. More specifically, some inputs corresponding to frequencies beyond the edges of the channel bandwidth are set to zero, thus providing an oversampling function to simplify the implementation of the subsequent transmission circuitry, as is known in the art. As described earlier, different sub-carrier bandwidths may be used on pilot blocks than on data blocks, corresponding to different pilot block and data block lengths. In the transmitter of FIGS. 8A and 8B, different sub-carrier bandwidths can be provided by different IDFT sizes (N) for pilot blocks and data blocks. For example, a data block may have N=512 and the number of usable sub-carriers within the channel bandwidth may be B=384. Then, an example of a pilot block having a larger sub-carrier bandwidth (and more specifically, a sub-carrier bandwidth twice as large as a data block) is obtained by using N=512/2=256 for the pilot block, with the number of usable pilot sub-carriers being B=384/2=192. In FIGS. 4A through 9B the number of usable data sub-carriers is 41, while in FIGS. 10A through 13B the number of usable data sub-carriers is 40. The specific set of sub-carriers out of those occupied by a data block or a pilot block are determined by the mapping block 805. In FIG. 14, an additional element is inserted in between 808 and 809 to perform a frequency shift by a fraction of the sub-carrier spacing. This shift can be equivalent to multiplication by $\exp(j2 \Delta ft)$, where $\Delta f$ is the desired shift.

Figure 16:
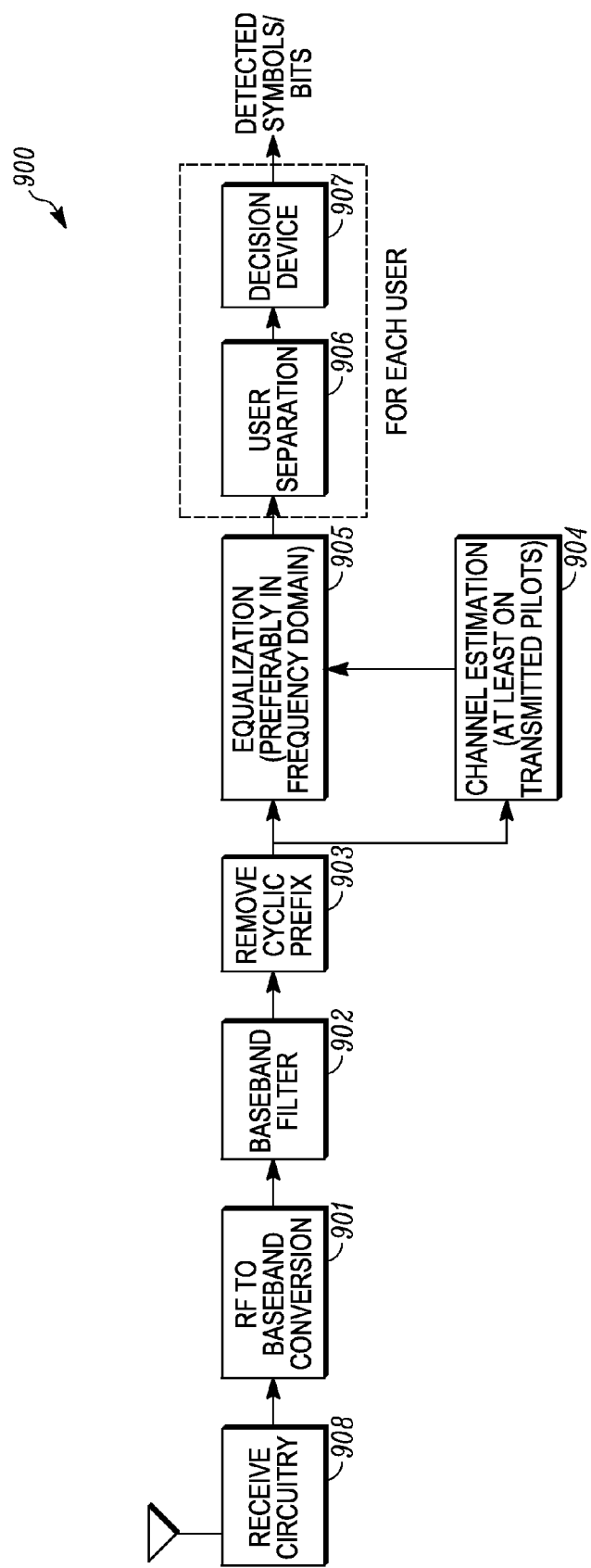
FIG. 16 is a block diagram of receiver.

FIG. 16 is a receiver block diagram 900. The received signal is a composite of the channel distorted transmit signal from all the transmitters. During operation, the received signal is converted to baseband by baseband conversion circuitry 901 and baseband filtered via filter 902. Once pilot and data information are received, the cyclic prefix is removed from the pilot and data blocks and the blocks are passed to channel estimation circuitry 904 and equalization circuitry 905. As discussed above, a pilot signal is commonly used for communication systems to enable a receiver to perform a number of critical functions, including but not limited to, the acquisition and tracking of timing and frequency synchronization, the estimation and tracking of desired channels for subsequent demodulation and decoding of the information data, the estimation and monitoring of the characteristics of other channels for handoff, interference suppression, etc. Circuitry 904 performs channel estimation on the occupied sub-carriers for the data block utilizing at least received pilot blocks. The channel estimate is passed to equalization circuitry 905 to equalize the data blocks on the occupied sub-carriers. Due to potential DC sub-carrier distortion, in one embodiment the receiver/equalizer ignores or sets to zero the received signal on the DC sub-carrier. In another embodiment, the receiver/equalizer may tolerate the distortion on the DC sub-carrier. In another embodiment, the receiver/equalizer may apply a weighting factor to the received signal on the DC sub-carrier (such as multiplying by a value less than 1) to reduce the influence of the distortion on the DC sub-carrier.

The equalizer may also perform advanced equalization techniques to cancel or lessen the impact of the distortion on the DC sub-carrier due to local oscillator leakage. The signal output from circuitry 905 comprises an appropriately equalized data signal that is passed to a user separation circuit 906 where an individual user's signal is separated from the data signal (the transmission from a single user corresponds to a transmission from each transmitter at the user). The user separation can be performed in the time-domain or frequency-domain and can be combined with the equalization circuitry 905. A decision device 907 determines the symbols/bits from the user-separated signal. In FIG. 15, an additional element is inserted before 904 and 905 to perform a frequency shift by a fraction of the sub-carrier spacing. This shift can be equivalent to multiplication by $\exp(-j2 \Delta ft)$, where $\Delta f$ is the desired shift, and is the inverse of the operation performed at the transmit side in the case.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication terminal, the method comprising:
    receiving a radio resource allocation comprising a plurality of sub-carriers that is a subset of available sub-carriers, wherein the available sub-carriers include a DC sub-carrier;
    when the DC sub-carrier is in a space including one or more sub-carriers between any two sub-carriers of the allocation, the DC sub-carrier and all but one edge-most sub-carrier of the allocation are designated for transmission;
    when the DC sub-carrier is not in a space including one or more sub-carriers between any two sub-carriers of the allocation, all of the sub-carriers of the allocation are designated for transmission and the DC sub-carrier is not designated for transmission; and
    transmitting information on one or more of the designated sub-carriers.

2. The method of claim 1, wherein the step of transmitting information on one or more of the designated sub-carriers further comprises spreading the information prior to transmission with a DFT of size equal to a number of the designated sub-carriers.

3. The method of claim 1, wherein the DC sub-carrier is adjacent to not more than one of the plurality of sub-carriers of the resource allocation.

4. The method of claim 1, wherein the DC sub-carrier is adjacent to more than one of the plurality of sub-carriers of the resource allocation.

5. The method of claim 1, further comprising transmitting information on consecutive sub-carriers of the one or more designated sub-carriers.

6. The method of claim 1, further comprising transmitting information on the equally spaced non-consecutive sub-carriers,
wherein the radio resource allocation is equally spaced and non-consecutive and includes the DC sub-carrier.

7. A method in a wireless communication network scheduling entity, the method comprising:
allocating a plurality of sub-carriers that is a subset of available sub-carriers to a wireless communication terminal, wherein the available sub-carriers include a DC sub-carrier,
when the DC sub-carrier is in a space including one or more sub-carriers between any two sub-carriers of the allocation, the DC sub-carrier and all but one edge-most sub-carrier of the allocation are designated for transmission,
when the DC sub-carrier is not in a space including one or more sub-carriers between any two sub-carriers of the allocation, all of the sub-carriers of the allocation are designated for transmission but the DC sub-carrier is not designated for transmission.

8. The method of claim 7, further comprising grouping the plurality of sub-carriers not including the DC sub-carrier into one or more resource blocks wherein each resource block comprises a common number of sub-carriers.

9. The method of claim 8, further comprising grouping the plurality of sub-carriers including the DC sub-carrier into an expanded resource block having more sub-carriers than other resource blocks.

10. The method of claim 7, wherein the plurality of sub-carriers allocated from the subset of available sub-carriers are consecutive sub-carriers.

11. The method of claim 7, further comprising allocating the plurality of sub-carriers that is the subset of available sub-carriers wherein the allocation is equally spaced and non-consecutive and includes the DC sub-carrier.

* * * * *